US008004103B2

(12) United States Patent
Brantingham

(10) Patent No.: US 8,004,103 B2
(45) Date of Patent: Aug. 23, 2011

(54) POWER GENERATION

(76) Inventor: Jeremy Brantingham, Minneapolis, MN (US)

( * ) Notice: Subject to any disclaimer, the term of this patent is extended or adjusted under 35 U.S.C. 154(b) by 470 days.

(21) Appl. No.: 12/261,384

(22) Filed: Oct. 30, 2008

(65) Prior Publication Data

US 2010/0109329 A1 May 6, 2010

(51) Int. Cl.
F03B 13/10 (2006.01)
(52) U.S. Cl. ............................................. 290/53; 60/295
(58) Field of Classification Search .................... 290/53; 60/495
See application file for complete search history.

(56) References Cited

U.S. PATENT DOCUMENTS

| 1,004,332 | A |   | 9/1911  | Allen |         |
|-----------|---|---|---------|-------|---------|
| 1,822,806 | A | * | 9/1931  | Geary | 60/507  |
| 4,184,336 | A |   | 1/1980  | Lamberti |      |
| 4,355,481 | A |   | 10/1982 | Joslyn |        |
| 4,455,781 | A |   | 6/1984  | Blumenthal |    |
| 4,455,824 | A | * | 6/1984  | Dabringhaus | 60/507 |
| 4,599,858 | A |   | 7/1986  | La Stella et al. |  |
| 6,111,491 | A | * | 8/2000  | Furuse et al. | 335/285 |
| 6,389,810 | B1 | * | 5/2002 | Nakomcic | 60/502 |
| 6,734,582 | B2 |   | 5/2004 | Corbett, Jr. et al. | |
| 6,857,266 | B2 |   | 2/2005 | Dick |          |
| 6,864,592 | B1 |   | 3/2005 | Kelly |         |
| 7,059,123 | B2 |   | 6/2006 | Welch, Jr. et al. | |
| 7,184,363 | B2 |   | 2/2007 | Szegedi et al. |   |
| 7,257,946 | B2 |   | 8/2007 | Welch, Jr. |     |
| 7,298,054 | B2 |   | 11/2007| Hirsch |         |
| 7,315,092 | B2 |   | 1/2008 | Cook |           |
| 7,323,790 | B2 |   | 1/2008 | Taylor et al. | |
| 7,327,049 | B2 |   | 2/2008 | Hamburg |       |
| 7,331,174 | B2 |   | 2/2008 | Welch, Jr. et al. | |
| 7,352,073 | B2 |   | 4/2008 | Ames |           |
| 7,501,723 | B2 | * | 3/2009 | Yasuda | 310/12.04 |
| 7,525,214 | B2 | * | 4/2009 | Atilano Medina et al. | 290/53 |
| 7,562,526 | B2 | * | 7/2009 | Lee | 60/507 |
| 2004/0061338 | A1 |  | 4/2004 | Woodbridge |  |
| 2006/0113855 | A1 |  | 6/2006 | Tsai et al. |  |
| 2008/0309088 | A1 | * | 12/2008 | Agamloh et al. | 290/53 |
| 2009/0146429 | A1 | * | 6/2009 | Protter et al. | 290/53 |
| 2010/0109329 | A1 | * | 5/2010 | Brantingham | 290/53 |
| 2010/0219633 | A1 | * | 9/2010 | Sichau et al. | 290/42 |
| 2010/0307149 | A1 | * | 12/2010 | Kwok | 60/496 |

FOREIGN PATENT DOCUMENTS

CN 201517465 U * 6/2010
WO 2006113855 A2 10/2006

OTHER PUBLICATIONS

CN 201517465 U Derwent translation dated Jun. 2010.*
Independent Natural Resources, Inc. World-wide Market Reserach—Updated Jun. 2007, accessed Oct. 29, 2008 at http:// inri.us/WECstudy/WEC%20Research%202007%020June%20Final.pdf.
Vining, Jennifer. "Ocean Wave Energy Conversion," ECE 699: Advanced Independent Study Report, Electrical and Computer Engineering Deparment, University of Wisconsin—Madison, Dec. 2005, 44 pgs, accessed Oct. 29, 2008 at http://homepages.cae.wisc.edu/~vining/JVining_WaveEnergyConversion.pdf.

* cited by examiner

Primary Examiner — Joseph Waks
(74) Attorney, Agent, or Firm — Brooks, Cameron & Huebsch, PLLC

(57) ABSTRACT

The present disclosure includes apparatus, methods, and systems for power generation. One power generator embodiment includes a shaft; a buoyant assembly slidably coupled to the shaft upon which the buoyant assembly rises and falls, the buoyant assembly configured to be moved in at least a first direction by a fluid on which the assembly is buoyant; wherein a first generator is arranged to create electric energy from interaction of a conductor with a number of magnetic elements on the buoyant assembly, in a manner to produce electricity, as the buoyant assembly moves on the shaft when falling in a second direction due to a gravitational force; and a slowing mechanism arranged to slow the movement of the buoyant assembly in order to separate an outer surface of the buoyant assembly from the fluid along at least a portion of the first or second direction.

20 Claims, 17 Drawing Sheets

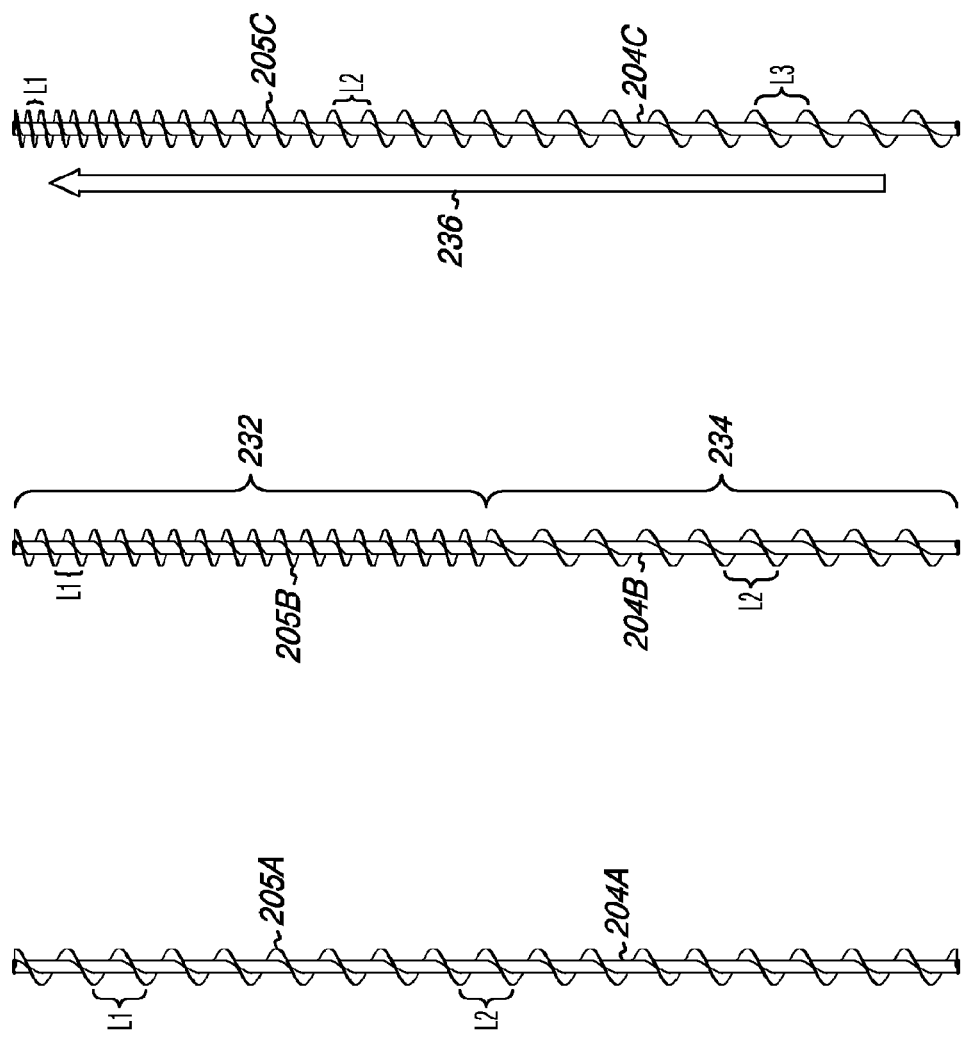

POWER GENERATION

TECHNICAL FIELD

The present disclosure relates generally to electrical power generation. More particularly, in one or more embodiments the present disclosure relates to devices for generating power from wave energy of a liquid.

BACKGROUND

Many different types of generators utilize mechanical power to convert movement in nature into electricity. For example, wind power, steam power, power developed from the combustion of ignited gases, hydro power, and other mechanical power inputs may be used to turn a rotor (e.g., having a magnetic field) relative to a stator (e.g., having one or more coils of wire) to generate electricity. Reciprocating linear motion may also be used to move a magnetic field relative to a conductor or vice versa in order to generate a current in the conductor.

Waves and tide changes of a body of water, such as the ocean, for example, are a potential source of mechanical energy, which may be converted into electrical energy. The waves and tide changes can produce repetitive linear motion in a relatively horizontal, as well as a relatively vertical, direction.

Mechanisms and techniques have been proposed to extract energy from these relative linear motions, including using a buoy to drive a linear electric generator. In such mechanisms, essentially vertical wave motion moves a magnet assembly relative to a stationary coil assembly, or vice versa as the buoy travels on top of the water.

Paddle systems and floats with a vertical gear coupled to a gear wheel around an axis, among others, have been proposed to "catch" wave motion and convert it to rotational mechanical energy. In such systems, the rotational energy is used to turn a generator in a conventional manner.

In some approaches, wave motion is used to pump hydraulic or pneumatic intermediaries (e.g., pump fluid uphill or pressurize a gas) from which the potential energy from the intermediary is subsequently used to drive a turbine, for example.

BRIEF DESCRIPTION OF THE DRAWINGS

FIG. 2A is a side view of a shaft having a helical thread with uniform inter-thread distances, in accordance with one or more embodiments of the present disclosure.

FIG. 2B is a side view of a shaft with a helical thread having areas of different inter-thread distances, in accordance with one or more embodiments of the present disclosure.

FIG. 2C is a side view of a shaft with a helical thread having graduated inter-thread distances, in accordance with one or more embodiments of the present disclosure.

DETAILED DESCRIPTION

Figure 1A:
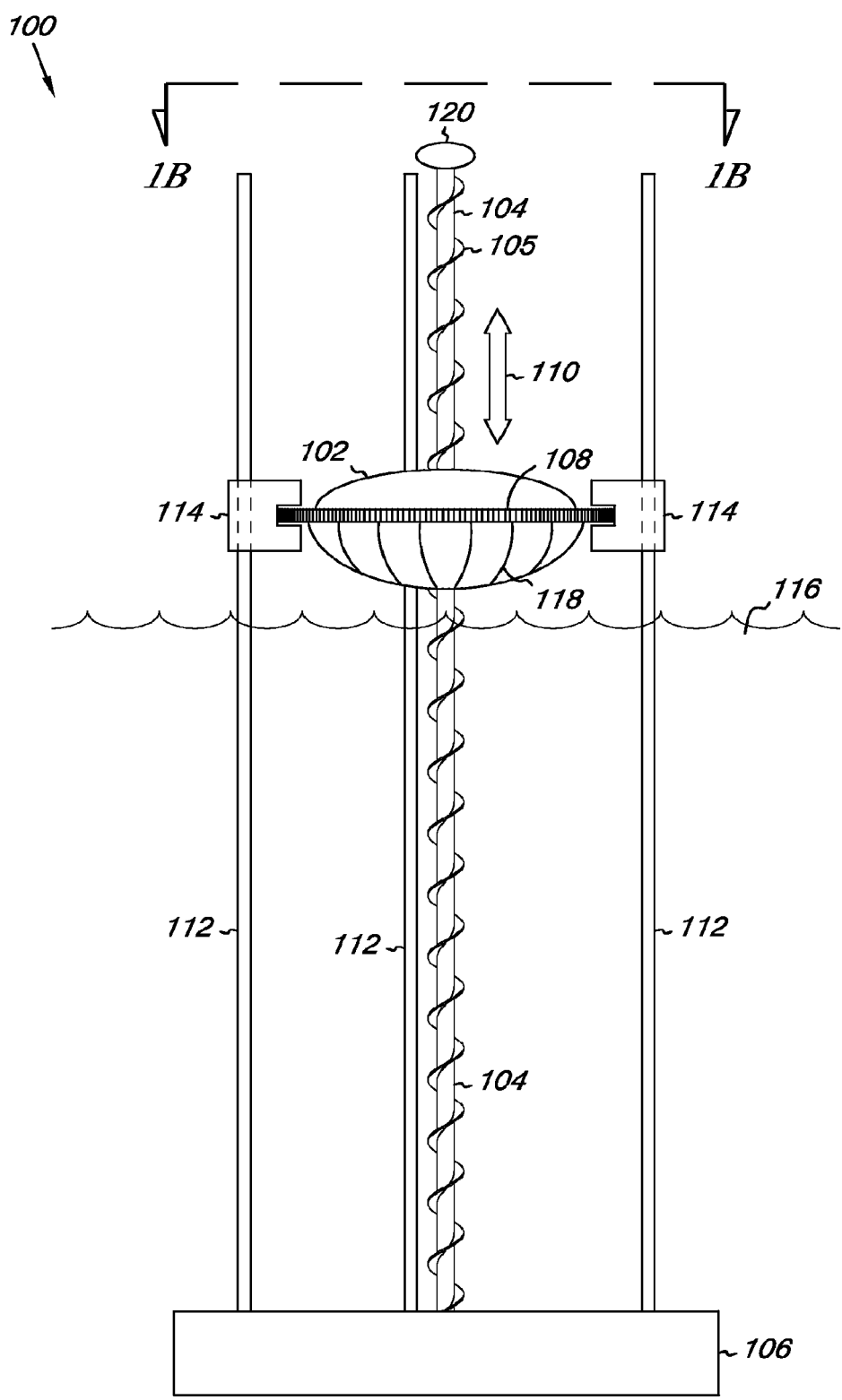
FIG. 1A is a side view of a buoyant power generator system having peripherally-located generator(s), in accordance with one or more embodiments of the present disclosure.

The present disclosure includes apparatuses and systems for a power generator. In some embodiments, unlike previous wave power generators, the power generating device moved by the wave, is separated from the surface of the liquid (e.g., water) as will be discussed in more detail below.

For example, embodiments of the present disclosure can, for instance, include a power generator having a shaft; a buoyant assembly slidably coupled to the shaft upon which the buoyant assembly rises and falls, the buoyant assembly configured to be moved in at least a first direction by a fluid on which the assembly is buoyant; wherein a first generator is arranged to create electric energy from interaction of a conductor with a number of magnetic elements on the buoyant assembly, in a manner to produce electricity, as the buoyant assembly moves on the shaft when falling in a second direction due to a gravitational force; and a slowing mechanism arranged to slow the movement of the buoyant assembly in order to separate an outer surface of the buoyant assembly from the fluid along at least a portion of the first or second direction.

The slowing mechanism that provides a force to slow the movement of the buoyant assembly in order to separate an outer surface of the buoyant assembly from the fluid, can be any suitable mechanism that provides forces such as frictional force, magnetic forces, and/or mechanical force. Examples of suitable frictional force mechanisms include, one or more tapered shafts, or one or more shafts having a cross-section that changes shape along its length, one or more helical shafts, or other such mechanisms that provide a change in frictional force that can slow the buoyant assembly sufficiently to separate at least some of the outer surface of the buoyant assembly that would be contacting the fluid in order for the assembly to ordinarily maintain its buoyant position on the fluid.

Examples of suitable frictional force mechanisms include, one or more tapered shafts, or one or more shafts having a cross-section that changes shape along its length, one or more helical shafts, or other such mechanisms that provide a change in frictional force that can slow the buoyant assembly sufficiently to separate at least some of the outer surface of the buoyant assembly that would be contacting the fluid in order for the assembly to ordinarily maintain its buoyant position on the fluid.

An example of a suitable mechanical force mechanism includes, one or more latch mechanisms in which the buoyant assembly is held in place and then released, for example by the fluid moving downward on the shaft and contacting a trigger release or by an electric actuated triggering mechanism, among other mechanical or triggering mechanisms.

One power generator embodiment disclosed herein includes a shaft having a helical thread, a first vertical support member arranged substantially parallel to the shaft, and a first generator slidably coupled to the first vertical support member. A clutch assembly is rotatably coupled to the shaft so as to engage with the helical thread for movement along the shaft in a first direction, and disengage from the helical thread for movement along the shaft in a second direction.

The power generator embodiment discussed above further includes a buoyant rotor assembly coupled to the clutch assembly and rotatably coupled to an axis of the first generator. The first generator is arranged to create electric energy from interaction of a conductor with a number of magnetic elements on the buoyant rotor assembly, in a manner to produce electricity, as the clutch assembly rotates about the shaft and along the helical thread when falling in the first direction due to a gravitational force.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. Also, the use of the terms vertical and horizontal are illustrative of the embodiments of the Figures and should not be viewed as limiting.

FIG. 1A is a side view of a buoyant power generator system having peripherally-located generator(s), in accordance with one or more embodiments of the present disclosure. FIG. 1A illustrates a side view of an embodiment of a buoyant power generator system 100, configured to extract mechanical energy from an oscillating fluid 116 (e.g., waves and/or tides, etc.) and convert it into electrical energy.

In the embodiment of FIG. 1A, the fluid 116 oscillates in a substantially vertical direction, with waves for example, supplying a repetitive input mechanical lifting force, in the form of buoyancy. The buoyant power generator system 100, of the embodiment of FIG. 1A, is arranged to convert the substantially vertical lifting work, first into vertical and rotational movement, and then at least a portion of the rotational energy is to be used to drive a generator to produce electrical energy.

In the embodiment of FIG. 1A, the buoyant power generator system 100 includes a buoyant assembly 102 (e.g., a float) an elongated shaft 104 having a helical thread 105 thereon, one or more vertical support members 112, and one or more periphery generator assemblies 114 slidably coupled to the vertical support members 112. In some embodiments, the top of shaft 104 may have a cap 120 coupled thereto, which according to one or more embodiments, may include an illumination device.

In one or more embodiments, cap 120 is large enough to prevent buoyant assembly 102 from sliding off of shaft 104 in, for example, rough seas. Certain embodiments may have cap 120 located on one or more of the vertical support members 112, in addition to, or in lieu of, on the top of shaft 104. The illumination device may be, for example, powered by the electricity generated by the buoyant power generator system 100.

The shaft 104, and/or one or more of the vertical support members 112, may be anchored to an optional base 106. The base 106 may, for example, be a solid mass (e.g., concrete, etc.) resting on the floor of a body of liquid within which the buoyant power generator system 100 is placed. In some embodiments, the base 106 may be buoyant relative to the liquid within which it is immersed, such that the buoyant power generator system 100 floats near the surface of the body of liquid. In some embodiments, the system can be further anchored, or tethered, to the floor of the body of liquid within which the buoyant power generator system is placed, for example, by attachment of a tether to the base 106.

According to one or more embodiments, the one or more vertical support members 112 may be, or may be attached to, vertical structural members of a sea-going platform (e.g., the legs of an oil drilling rig). The shaft 104, and/or the one or more vertical support members 112, may be secured to one or more horizontal structural members (not shown), such as the horizontal structure of a sea-going platform, such as an oil drilling rig. Such structural members may be attached to the floor of the body of liquid or may be buoyant within the liquid.

The one or more vertical support members 112 can have a cross-section that is round, oval, square, or any number of other suitable shapes, and may be hollow for routing conductors used to connect the periphery generators to an external power system (not shown). The vertical support members 112 can be constructed of a material that can provide structural strength, as well as withstand ocean conditions for a relatively long period of time, such as metal, PVC, or one or more composite materials, or combinations of these or other suitable materials.

The buoyant assembly 102, in the embodiment of FIG. 1A, can include of any number of suitable buoyant materials and/or shapes, such that the buoyant assembly 102 and the supported weight of the periphery generators 114, are buoyant relative to the fluid 116. For example, the buoyant assembly 102 can be of any appropriate shape in the vertical dimension, and have a round circumference in a plane perpendicular to the shaft 104 orientation.

In some embodiments, the surface of the buoyant assembly 102 may be smooth (as shown on its top portion in FIG. 1A). In some embodiments, the buoyant assembly may have internal or external ridges 118 (such as for structural strength, and as shown on its bottom portion in FIG. 1A), or any other suitable shape consistent with the operation described herein. Such ridges can, in some embodiments, aid in moving (e.g., lifting and/or rotating) the buoyant assembly.

The buoyant assembly 102 is rotatably coupled to shaft 104 through a clutch assembly (e.g., a mechanism that can change the rotational direction of the buoyant assembly, can switch engagement in order continue to rotate the buoyant assembly in both directions along the shaft, or can engage the shaft to turn the buoyant assembly in one direction along the shaft and disengage the shaft in another direction along the shaft) (not shown) for movement relative to the shaft 104. For example, the clutch assembly is configured to engage with the helical thread 105 as it moves along the shaft in a first direction (e.g., downward) causing the clutch and buoyant assembly 102 to rotate about the shaft 104.

In some embodiments, the clutch assembly is configured to disengage with the helical thread 105 on the shaft 104 as it moves along the shaft in a second direction (e.g., upward). This allows the buoyant assembly 102 to continue rotating freely, or at least not to impeded movement of the buoyant assembly 102 in an upward direction (e.g., as it is being lifted up the shaft 104 by waves of the fluid 116) (e.g., a body of water such as the ocean).

Any suitable type of clutch assembly may be utilized. For example, a clutch assembly having such suitable operating principles may be found in a child's toy top, which engages to impart force to spin the top in one direction, but disengages to allow the top to spin freely in the opposite direction.

In some such embodiments, a clutch assembly can be configured so that near the top of the shaft 104, as a wave recedes lessening an buoyancy force supporting the buoyant assembly 102, causing the buoyant assembly 102 to exert a downward pressure on the clutch assembly to engage it with the helical thread 105. As the buoyant assembly 102 is lifted by a wave, the buoyant assembly 102 does not exert any downward force on the clutch, thereby causing it to disengage, or release, from the helical thread 105. If released while rotating, the buoyant assembly 102 may be free to continue to rotate due to the inertia imparted thereto by following the path dictated by helical thread 105 on the downward movement.

According to one or more embodiments, a flywheel style buoyant assembly 108, may be utilized. In such embodiments, a substantial amount of the weight of the assembly may be located at or near the circumference of the buoyant assembly 102. In some such embodiments, the flywheel 108 may include a majority of the mass of the buoyant assembly 102, thus providing a large inertia as the buoyant assembly 102 rotates along the helical thread due to the force of gravity.

The momentum of such a spinning flywheel may be maintained if the frictional interaction with the shaft is low. Generally, the lower the frictional influence, the longer the mass will rotate due to the inertia and momentum imparted to the assembly through the rotation of the assembly.

Generally, the buoyant assembly 102 moves up and down the shaft 104, as shown by direction arrow 110. The buoyant assembly 102 is lifted up on the shaft 104 by waves of the fluid 116 (with the clutch disengaged), and falls by gravitational force, with the clutch engaged, thus following along the incline of the helical thread 105. In following the helical thread 105, some of the potential energy of the lifted buoyant assembly 102 is converted into rotational kinetic energy.

In order to harness this kinetic energy, one or more generators can be used. For example, a periphery generator assembly 114 can be slidably coupled to the vertical support members 112, and engaged by contact or proximity with a portion of the flywheel 108.

Rotational energy of the buoyant assembly 102 can be transmitted by the flywheel 108 to, for example, an axis of a generator located within the periphery generator assembly 114. Any suitable generator can be utilized.

One suitable type of generator is the style where a rotor (i.e., a non-stationary component of an electric generator or motor, generally referred to herein as a generator) passes proximate to a stator (i.e., a stationary component of a generator or motor). The proximity to the stator can be any suitable distance to allow the generation of electricity at the rotor and/or stator.

Another suitable generator, for example, is a generator similar to one powered from contact with a spinning bicycle wheel. Such a generator can provide transmission of rotational energy from the flywheel to a periphery generator assembly 114.

A periphery generator assembly, such as that illustrated at 114 of the embodiment of FIG. 1A, may have bearing means in contact with the top and/or bottom edges of the flywheel 108 or as stated above, may be proximate to one or more surfaces of the flywheel. The periphery generator assembly 114 may fall under its own mass along the vertical support member 112 to which it is slidably coupled or may be guided to fall at a particular rate (e.g., a rate corresponding to that of the assembly, via a corresponding shaft or other suitable mechanism).

In some embodiments, one or more of the periphery generators may generate electricity based upon interaction with the vertical support member. For example, a wheel or gear may contact the surface of the vertical support member and such contact can cause the wheel or gear to turn thereby generating electricity.

Types of electricity generation that can be utilized with respect to interaction with the vertical support member include mechanical, magnetic, and other such suitable mechanisms known in the art. Such mechanisms can be used in addition to or substitution of the rotational mechanism described herein.

Such mechanisms can be used in embodiments where the buoyant assembly may not rotate. Additionally, such generator types can be used with respect to the shaft in some embodiments, particularly where a smooth shaft is utilized.

In some embodiments, the periphery generator assembly 114 can be adapted to receive the flywheel 108 such that vertical forces may be transmitted between the flywheel 108 and the periphery generator assembly 114, as shown in FIG. 1A. Thus, the periphery generator assembly 114 can be lifted up its respective vertical support member 112, by transmission of a buoyancy force imparted to the buoyant assembly 102 by the fluid 116. In some embodiments, the periphery generator assemblies 114 can be arranged such that they are held out of the fluid 116, for example, with the buoyant assembly 102 extending sufficiently below the elevation of the periphery generator assemblies 114.

In some embodiments, power generator system 100 can be moored offshore (e.g., in the ocean or other body of water) in an area where waves and/or tides are common. As waves propagate past system 100, the waves move the buoyant assembly 102 generally upwardly and downwardly (e.g., 110) relative to and along shaft 104. This can also be accomplished with the rising and falling of tides. In such embodiments, system 100 converts at least some of the motion provided by the waves into rotational motion, which is used to turn the rotor of an electric generator (e.g., in the one or more periphery generator assemblies 114).

Figure 1B:
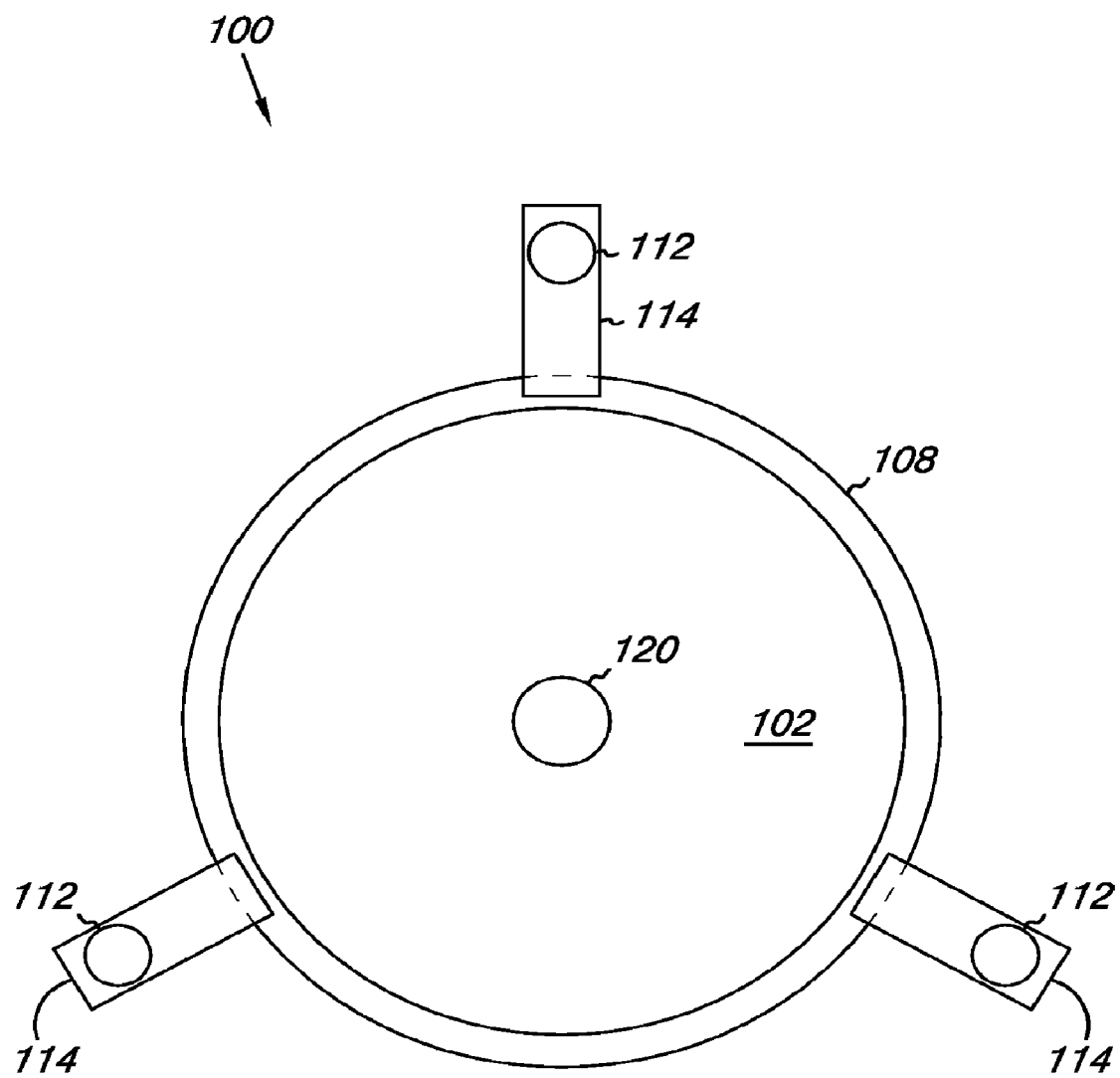
FIG. 1B is a top view of a buoyant power generator system having periphery generators, in accordance with one or more embodiments of the present disclosure.

FIG. 1B is a top view of a buoyant power generator system having periphery generators, in accordance with one or more embodiments of the present disclosure. This top view of the buoyant power generator system 100 is taken along 1B-1B of FIG. 1A, and illustrates the buoyant assembly 102, including a flywheel type structure 108 about its circumference.

Orientation of the vertical support members 112, as well as the periphery generator assemblies 114 slidably coupled thereto can be appreciated. While three vertical support members 112 are shown in FIG. 1B, embodiments of the present disclosure are not so limited, and may have more, or fewer, than three vertical support members 112. Some embodiments may not have any support members other than the shaft or multiple shafts may be used. In the embodiment of FIG. 1B, location of a cap 120, atop a centrally-located shaft, is also shown.

Figure 1C:
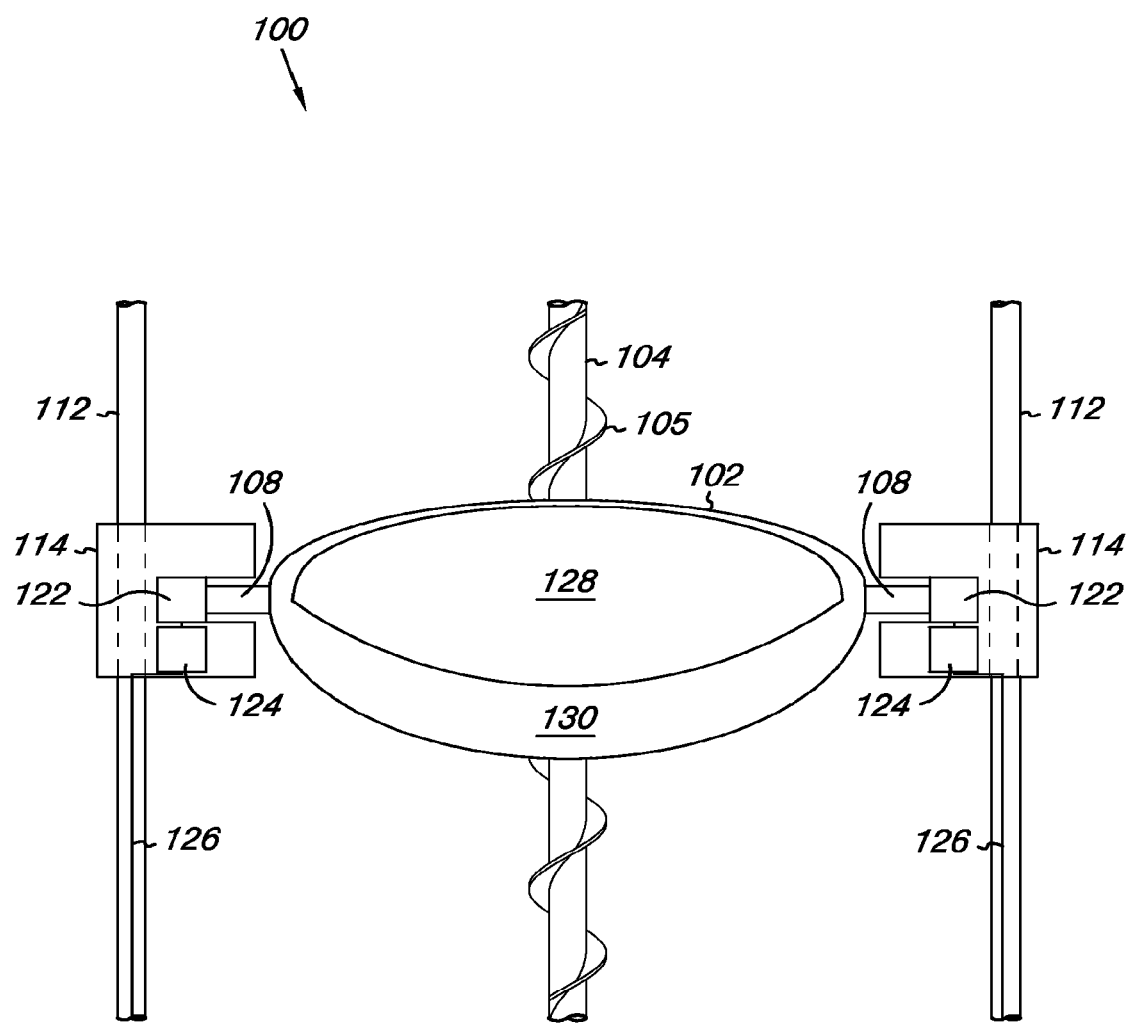
FIG. 1C is a cross-sectional view of a buoyant power generator system having periphery generators, in accordance with one or more embodiments of the present disclosure.

FIG. 1C is a cross-sectional view of a buoyant power generator system having a number of periphery generators, in accordance with one or more embodiments of the present disclosure. In the embodiment of FIG. 1C, the buoyant power generator system 100 includes two vertical support members 112, laterally opposed from one another across the diameter of the buoyant assembly 102.

Internal to the buoyant assembly 102, is a buoyant member 130 and an area 128. Area 128 may be empty space (e.g., air) or filled with foam, or a liquid, or filled by other buoyant material, or may be occupied by a dense mass, to further increase angular momentum and inertia as the buoyant assembly 102 rotates around shaft 104 via helical surface 105. According to one or more embodiments, space 128 may be occupied by electronics or other devices (e.g., communication and/or computing devices associated with the location and/or operation of the buoyant power generator system 100). In some embodiments, the buoyant member 130 and area 128 may be reversed, so the area 128 is below the buoyant member 130.

In the embodiment of FIG. 1C, each periphery generator assembly 114, is slidably coupled to a vertical support member 112, may include an electric generator 124 having an axis in contact, e.g., by friction or gearing, with portion of the buoyant assembly 108 around the circumference thereof. The axis is shown exaggerated in FIG. 1C, having for example, a wheel or bearing 122 held in contact with the flywheel 108.

As the flywheel 108 turns, it causes wheel to turn, which is coupled to turn the generator and generate electricity. An outlet conductor 126, coupled to the generator 124, provides an outlet path for the generated electricity. While shown exiting downward through or along a vertical support member 112, embodiments of the present disclosure are not so limited, and the outlet conductor 126 may, for example, be directed upward, for instance, to power an illumination element atop the vertical support member 112.

FIGS. 2A-2C illustrate several embodiments of a shaft (e.g., 104 in FIG. 1A) having a helical thread (e.g., 105 in FIG. 1A). The differences in the several embodiments include different distances along the length of the shaft between successive turns of the helical thread. This may be referred to as pitch, thread spacing, threads per unit of length, or other such suitable descriptions.

As mentioned above, a rising or falling fluid can provide a mechanical force input to a buoyant power generator system (e.g., 100 in FIG. 1A). In wave or tidal systems, this movement can be provided by repetitively lifting the buoyant power generator system, thereby increasing the potential energy of the buoyant power generator system.

The potential energy available is due to application of the force of gravity to the mass of the buoyant power generator system. However, the force of gravity may be opposed, in part by a buoyancy force applied to the buoyant power generator system by a fluid within which it may reside, and the friction of the helical thread when the clutch is engaged thereto.

Indeed, to lift the buoyant power generator, the buoyancy force must exceed the gravitational force, because potential energy is a product of the net of gravitational force minus buoyancy force. In some instances, the potential energy can be increased, for example, when the buoyancy force goes to zero (e.g., the buoyant power generator system is lifted out of and separated from the fluid providing the buoyancy force).

According to one or more embodiments of the present disclosure, the helical threads (e.g., 105 in FIG. 1A) located on the central shaft (e.g., 104 in FIG. 1A) can be arranged to provide more or less friction to the clutch by adjusting the angle of incline of the thread at any given point. For example, at one extreme, a vertical shaft having no threads will provide no frictional resistance, and the buoyant assembly will be free to fall according to the full force due to gravity. In such an embodiment, none of the gravitational force would be converted into rotational energy.

At the other extreme, a horizontal thread, i.e. with no vertical component to its "incline" will oppose entirely (if it can support the buoyant assembly) the force of gravity, and does not allow any vertical motion (and also does not convert potential energy into rotational energy). Thus as a wave pushes the buoyant assembly up the shaft, and the clutch engages to catch the horizontal thread as the buoyant assembly attempts to fall (thus stopping the fall), the wave may then recede from beneath the buoyant assembly, with the thread providing all the force opposing gravity.

Between these two extreme examples are thread configurations that may initially hold up the buoyant assembly using threads providing a greater frictional component (e.g., more horizontal and less vertical incline). With such thread configurations, the buoyant assembly's initial vertical speed can be mitigated so that the lifting wave can recede and separate from the buoyant assembly so as to remove all buoyancy force therefrom.

FIG. 2A is a side view of a shaft having a helical thread with uniform inter-thread distances, in accordance with one or more embodiments of the present disclosure. Similar to the helical thread of a screw, shaft 204A has a helical thread 205A around the circumference of the shaft 204A that has equal distances between successive turns of the helical thread. In other words, distance L1 between a first set of successive turns of the helical thread, is equal to L2 between a second set of successive turns of the helical thread, and this is true along the entire length of shaft 204A.

However, embodiments of the present disclosure are not so limited, and L1 may be different than L2. A clutch may be configured to initially delay the beginning of falling along the shaft 204A for some predetermined time to allow a fluid (e.g., a wave) to recede from beneath buoyant assembly.

In some embodiments, more than two changes in thread spacing may be used. For example, the top of shaft 204A may have a first thread spacing, the middle may have a second thread spacing, and the bottom may have a third thread spacing.

In some embodiments, one or more of the multiple thread spacings may be the same. For example, the top and bottom of shaft 204A may have the same thread spacing and the middle may have a different thread spacing.

FIG. 2B is a side view of a shaft with a helical thread having areas of different inter-thread distances, in accordance with one or more embodiments of the present disclosure. Shaft 204B is illustrated having more than one portion (e.g., a first portion 232 and a second portion 234). Shaft 204B has a helical thread 205B around the circumference of the shaft 204B that has equal distances between successive turns of the helical thread within each portion. However, the distance L1 between successive turns of the helical thread 205B in the first portion 232 is different than the distance L2 between successive turns of the helical thread 205B in the second portion 234.

According to one more embodiments, the distance L1 along the length of the shaft between successive turns of the helical thread 205B is smaller for the first portion 232 than for the second portion 234, where the first portion 232 is located at a higher elevation on the shaft 204B than the second portion 234. Where the length of the shaft between successive turns of the helical thread 205B is smaller, the incline of the helical thread is more horizontal, and thus may provide more friction to impede vertical motion (given that the material and finishing of that material is the same and the conditions around the threading are the same, such as whether the thread is wet or covered in salt, grime, etc.).

Such a helical screw configuration (e.g., for first portion 232) may initially impede the vertical motion of a buoyant assembly down the shaft 204B as it begins to fall, thus allowing a fluid (e.g., wave) to recede away from below the buoyant assembly relatively faster. The incline of the helical thread changes for the second portion 234, thereby imparting less vertical friction.

In such embodiments, the shaft 204B could be positioned such that the fluid lifts the clutch of a buoyant assembly into the area of the first portion 232, and recedes vertically so that the clutch may reach the second portion 234 before buoyant assembly contacts the fluid providing the lifting buoyant force to begin another oscillation cycle.

As discussed above, while two portions are illustrated in FIG. 2B, embodiments of the present disclosure are not so limited, and may include more than two portions. For example, a third portion, with the length of the shaft 204B between successive turns of the helical thread 205B being the same, or different, from the length of the shaft 204B between successive turns of the helical thread 205B in the first 232 or second 234 portions.

In some embodiments, the length of the shaft 204B between successive turns of the helical thread 205B may be shorter so as to convert vertical velocity into increase rotational energy of the buoyant assembly near the base of shaft 204B. Other configurations are contemplated corresponding to particular conditions of the body of fluid in which embodiments of the present disclosure may be situated.

FIG. 2C is a side view of a shaft with a helical thread having graduated inter-thread distances, in accordance with one or more embodiments of the present disclosure. Shaft 204C is illustrated having a helical thread 205C, the distance along the length of the shaft 204C between successive turns of the helical thread 205C being increasingly shorter along a length 236 of the shaft.

Configuring the shaft 204C with a helical thread 205C having graduated inter-thread distances, with the inter-thread distances getting shorter at higher elevations of the shaft 204C (e.g., L1<L2<L3), can avoid having to position the shaft such that waves lift a buoyant assembly into a first portion 232, as illustrated in the embodiment of FIG. 2B. Waves will lift the buoyant assembly into an area of shorter inter-thread distances to improve initial separation of the buoyancy forces from the buoyant assembly at the apex of the wave lifting action.

The inter-thread distances are shown in FIG. 2C getting smaller at higher elevations; however, embodiments of the present disclosure are not so limited. The helical thread 205C may be configured to have graduated inter-thread distances along only a portion of the length of the shaft 204C, and for example, may have uniform inter-thread distances along another portion of the length of the shaft 204C. The helical thread 205C may be configured to have graduated inter-thread distances getting shorter in a direction along one portion of the length of the shaft 204C, and getting longer in the same direction along a second portion of the length of the shaft 204C.

Configuring the helical thread such that distance along the length of the shaft between successive turns of the helical thread are arranged to initially slow vertical movement down the shaft of the clutch assembly so as to provide temporary separation of the buoyant assembly from a receding buoyant force. It will be understood that "separation" may also connote reduction in buoyancy force applied to the buoyant assembly where complete separation is not realized. Such a design can, for example be used to increase or maximize the net of gravitational force minus buoyancy force on the downward travel of the buoyant assembly.

Figure 3A:
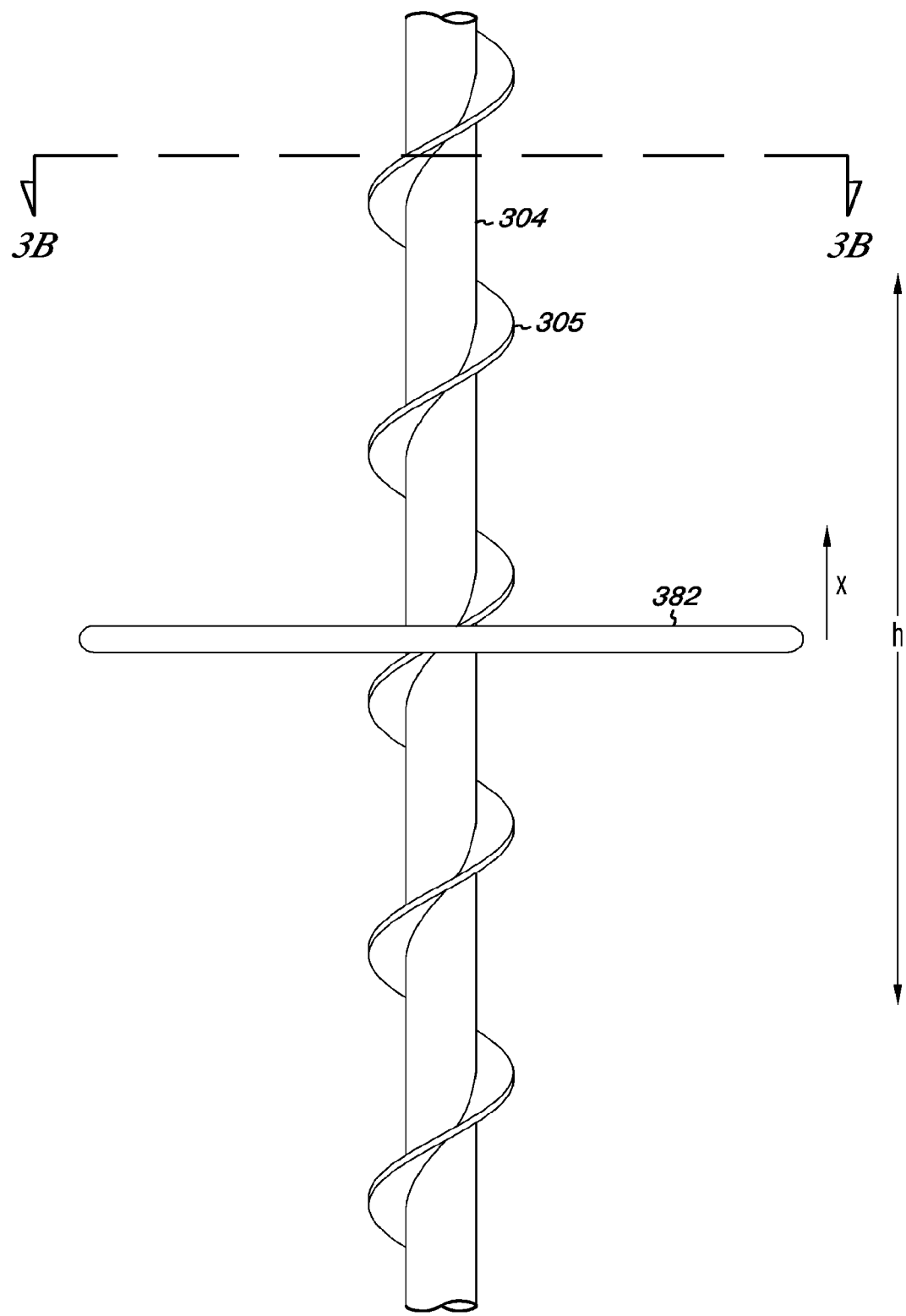
FIG. 3A illustrates a close-up view of an embodiment of the present disclosure having a helical shaft and a disk-like buoyant member.
Figure 3B:
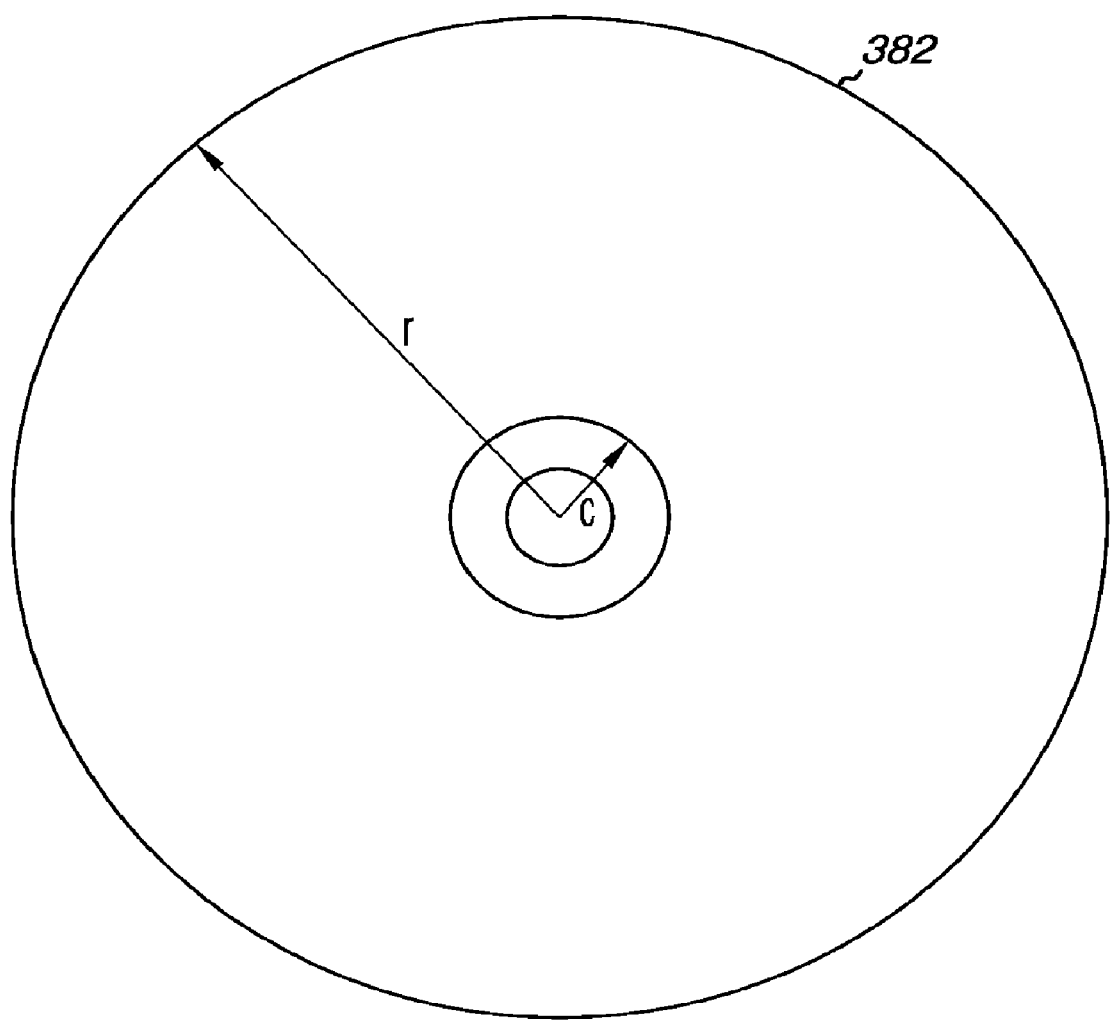
FIG. 3B illustrates the top view of the embodiment of FIG. 3A taken along line 3B-3B.
Figure 3C:
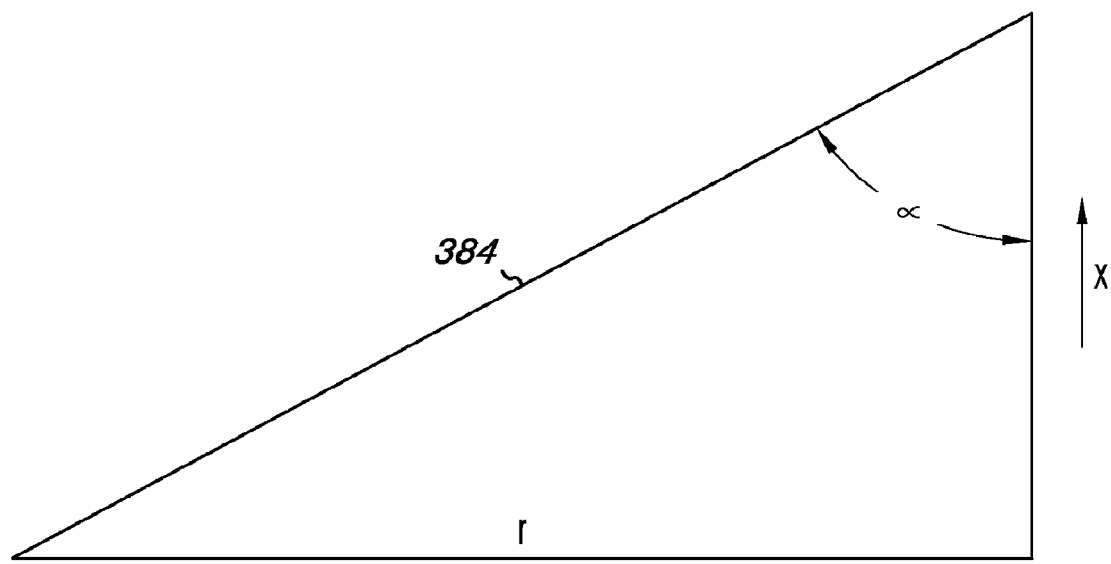
FIG. 3C illustrates generally, the slope of the helical thread of the embodiment illustrated in FIG. 3A.

The principles of how such a device would work are based upon the conversion of potential energy into kinetic translational and rotational energy by the movement upward and downward of the buoyant assembly and the rotation caused by the interaction of the assembly with the helical shaft. FIGS. 3A-3C can be used with the equations provided below to help understand some of the physics involved in the various embodiments of the present disclosure.

FIG. 3A illustrates a close-up view of an embodiment of the present disclosure having a helical shaft and a disk-like buoyant member. The use of a disk-like member is helpful for this explanation as disks are easier physical structures and can be more easily used from an equation standpoint, but such use should be viewed as instructive for the reader and not limiting on the embodiments as claimed herein.

In the embodiment of FIG. 3A, the device includes a shaft 304 having a helical thread 305 thereon. The embodiment also includes a disk-like buoyant assembly 382. For purposes of the equations below, the values x and h are shown. Value x is the distance the buoyant assembly moves as it is lifted by the fluid, h is height that the buoyant assembly will fall, which may be different than x in some instances.

FIG. 3B illustrates the top view of the embodiment of FIG. 3A taken along line 3B-3B. In the embodiment of FIG. 3B, the disk-like buoyant assembly 382 has an inner radius c and an outer radius r.

FIG. 3C illustrates generally, the slope of the helical thread of the embodiment illustrated in FIG. 3A. In addition to illustrating the slope of the thread 384, this figure also provides components useful in the equations below.

In describing the physics of some of the disclosed embodiments, energy can be conserved from one stroke (i.e., an upward and downward cycle) to the next by allowing the buoyant assembly or a portion thereof to continue to rotate as it is moved upward in a successive cycle.

The equations provided below describe some of the physics at work in the various embodiments discussed herein. Generally speaking, the buoyant assembly when elevated to a height (h) has the following potential energy $E_0$ (energy at time 0, due to its mass (m) and gravity (g)) $E_0 = mgh$.

Once the assembly starts to move, the potential energy begins to be converted into kinetic energy that includes both translational and rotational components as quantified in the following equation $$E = mgx + \frac{1}{2}m\dot{x}^2 + \frac{1}{2}I_H\dot{\Theta}^2 - f.$$

In this equation, the first two quantities $$mgx + \frac{1}{2}m\dot{x}^2$$

represent the translational components.

Similarly to the energy at time 0 equation, this equation includes m and g but h is now represented with x in the first quantity and the time derivative of x, ($\dot{x}$), in the second quantity. The third quantity of the new energy equation, $$\frac{1}{2} I_H \dot{\Theta}^2,$$

represents the rotational component. This quantity can also be represented as follows.

$$KE_{Rot} = \frac{1}{2} I_H \dot{\Theta}^2 = \frac{1}{2} I_H \left[ \frac{A^2 T}{2r \cos \alpha} \right]^2$$

In these equations, $I_H$, is the inertia of a hollow cylinder (e.g., disk with hole in the middle) and can generally be represented by the equation, $$I_H = \frac{1}{2} m(r^2 + c^2).$$

The third quantity also includes the value $\dot{\Theta}$ which is the angular velocity. The relationship between the angular velocity and time derivative of x can be illustrated in several ways. For example, the following two equations illustrate two ways in which they can be related to each other $$\dot{\Theta} = \frac{\dot{x}}{r \cos \alpha} \text{ and } \dot{x} = r \dot{\Theta} \cos \alpha(x)$$

Also, in the new energy equation, f represents negative forces which can be used to quantify any forces that will act to reduce the amount of energy provided by the device. For example, friction between the buoyant assembly and the helical shaft, interaction with the air around the buoyant assembly, and interaction with the fluid are all forces that can be generally represented as f, among other forces.

One of the advantages of various embodiments of the present disclosure is that the fluid raises the buoyant assembly above the low level of the fluid (e.g., due to a wave or tide) and if the embodiment allows a separation from the fluid, then the buoyant assembly can utilize the greater gravity versus negative force portion of the equation because the buoyant force of the fluid offsetting the force due to gravity has been removed. This can allow a buoyant assembly to spin faster, longer, and/or fall quicker than when the buoyant assembly is in contact with the fluid. The angular velocity can also be quantified in terms of acceleration based upon the following equation $$\dot{\Theta} = \frac{[A\sqrt{h-x}]}{r \cos \alpha} = \frac{A^2 T}{2r \cos \alpha}.$$

In this equation $$A = \sqrt{\frac{2(mg - f)}{m + \frac{I_H}{r^2 \cos^2 \alpha}}}.$$

These equations illustrate that a change in the slope of the thread (even over a period of time that is less than the entire fall from height h can change both the acceleration of the buoyant assembly and the angular velocity. This can also be seen in the following three equations where the distance x is viewed as a function of time $$\frac{dx}{dt} = \left[ \pm \sqrt{\frac{2mg}{m + \frac{I_H}{r^2 \cos^2 \alpha}}} \right] \sqrt{h-x} = \pm A(\alpha(x)) \sqrt{h-x},$$

$$x(T) = h - \frac{A^2 T^2}{4}, \text{ and } x_{TFall} = 0 = h - \frac{A^2}{4} T_F^2.$$

The last equation describes the time it would take the buoyant assembly to fall from height h and in that equation, $T_F$ is provided by $$T_F \sqrt{\frac{4h}{A^2}} = \frac{2}{A} \sqrt{h}.$$

Figure 4A:
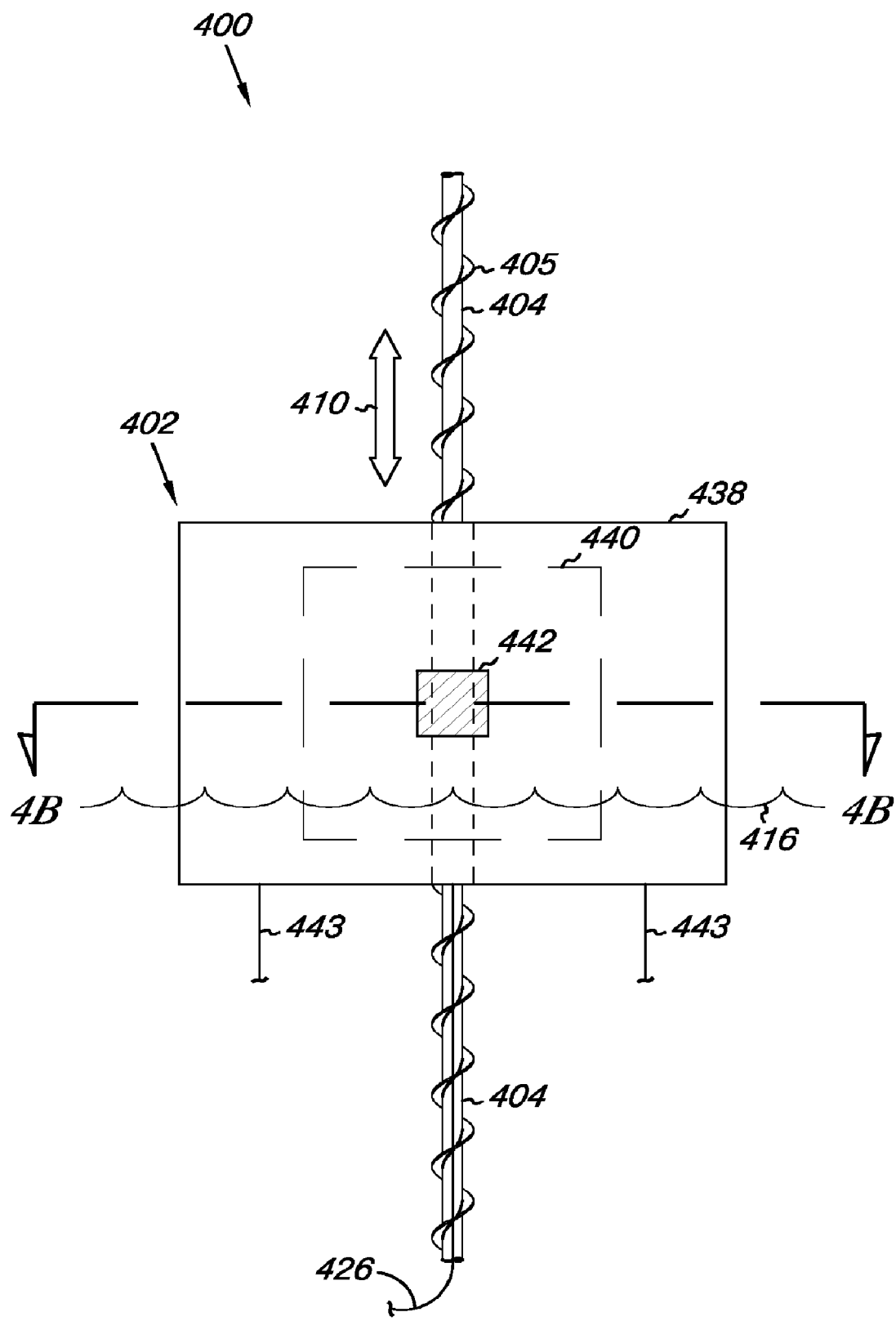
FIG. 4A is a cross-sectional view of a buoyant power generator system having a buoyant power generator, in accordance with one or more embodiments of the present disclosure.

FIG. 4A is a cross-sectional view of a buoyant power generator system having a buoyant assembly, in accordance with one or more embodiments of the present disclosure. FIG. 4A illustrates a buoyant power generator system 400 including a buoyant assembly 402 rotationally coupled to a shaft 404 having a helical thread 405. Buoyant assembly 402 generally moves up and down shaft 404, as indicated by arrow 410, being lifted upward by fluid movement (e.g., wave action) and falling by gravity.

One or more embodiments of the buoyant assembly 402 includes a clutch assembly 442 rotatably coupled to the shaft 404 so as to engage with the helical thread 405 for movement along the shaft 404 in a first direction (e.g., vertically downward generally toward the fluid 416) and disengage from the helical thread 405 for movement along the shaft in a second direction (e.g., vertically upward generally away from the fluid 416).

As will be discussed in greater detail later, one or more embodiments of the buoyant assembly 402 further includes a buoyant stator assembly 438 having a number of conductor windings, a rotor assembly 440 coupled to the clutch assembly 442 and rotatably coupled to the buoyant stator assembly 438. The rotor assembly includes a magnetic field source (e.g., permanent magnet or electromagnet) positioned proximate to the windings located in the assembly 438.

However, embodiments of the present disclosure are not so limited, and the stator assembly 438 may contain the magnetic field source, with the rotor assembly 440 containing the conductor windings. Brushes may be used in such a configuration to transmit electricity generated in the conductor(s) of the rotor to, for example, the shaft 404, and/or an outlet conductor 426 in the shaft 404, for further transport.

In either configuration, the rotor 440 and stator 438 assemblies can be arranged to move a magnetic field relative to conductor windings, thereby generating electricity in the conductor windings. Such relative movement occurs, for example, as the clutch assembly rotates about the shaft 404, along the helical thread 405, when falling in one direction (e.g., toward the fluid 416) by gravitational force. However, embodiments of the present disclosure are not so limited, and the clutch may be arranged such that relative movement between the rotor and stator occur (and thus electric generation occurs) as a result of the buoyancy force applied by the fluid 416 in pushing the buoyant assembly 402 up the shaft.

As shown in FIG. 4A, the stator assembly 438 may be tethered by anchor lines 443, rather than vertical support members (e.g., 112 in FIG. 1A) to maintain the stator assembly 438 in a rotationally stable orientation. Such anchoring may be used to not only keep the buoyant power generator system 400 in a particular geographic area (e.g., keep it from drifting) but also may tend to keep the stator assembly 438 from rotating such that the rotor assembly 440 may rotate on the helical thread 405 relative stator assembly 438. For configurations of the buoyant assembly 402 having a magnetic field source located within the rotor assembly 440 and conductor windings located with the stator assembly 438, anchor lines 443 may also serve as an outlet conductor (or an outlet conductor may be routed along anchor lines 443 to an electricity collection infrastructure).

Figure 4B:
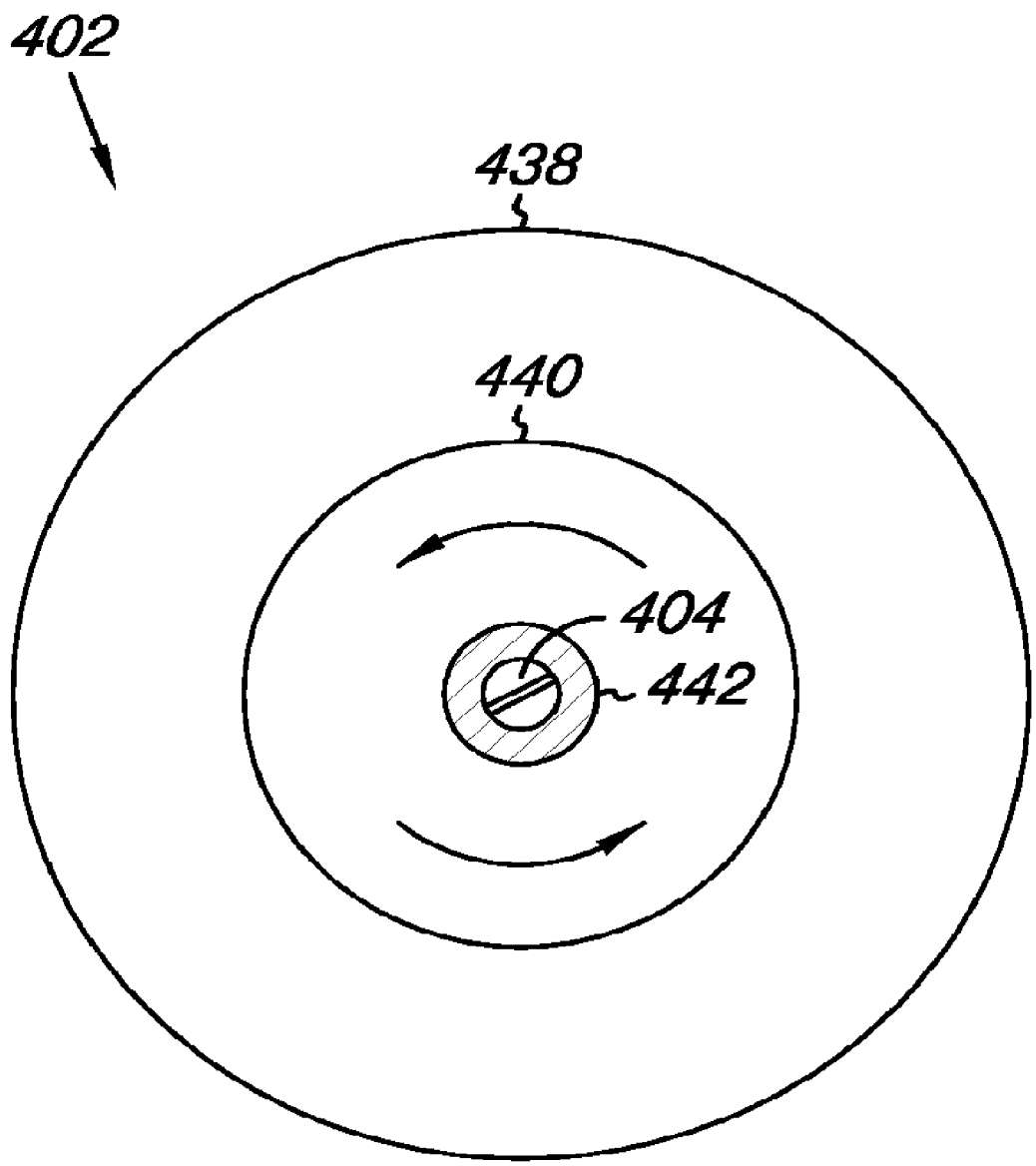
FIG. 4B is a top view of a buoyant assembly, in accordance with one or more embodiments of the present disclosure.

FIG. 4B is a top view of a buoyant assembly 402, in accordance with one or more embodiments of the present disclosure. This view of the buoyant assembly 402 is taken along line 4B-4B of FIG. 4A, and illustrates a radial orientation of the shaft 404, a rotor assembly 440 rotatably coupled to the shaft 404 through the clutch assembly 442, and a stator assembly 438 rotatably coupled to the rotor assembly 440 (e.g., by bearing assemblies (not shown in this figure), however, such assemblies are shown in FIGS. 4B and 5).

Figure 5A:
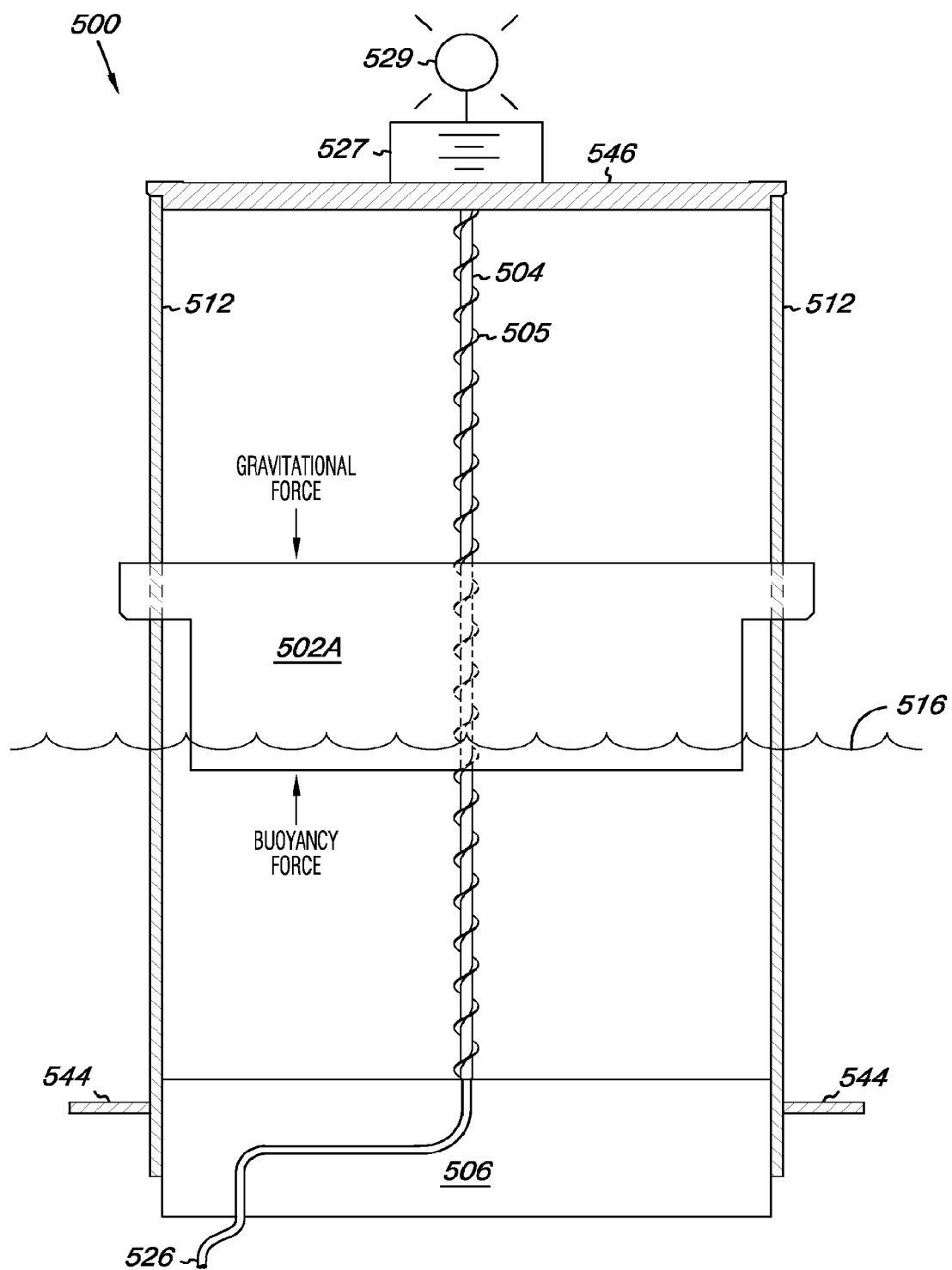
FIG. 5A is a side view of a buoyant power generator system having a buoyant generator, in accordance with one or more embodiments of the present disclosure.

FIG. 5A is a side view of a buoyant power generator system having a buoyant generator, in accordance with one or more embodiments of the present disclosure. FIG. 5A illustrates a buoyant power generator system 500 including a buoyant assembly 502A, a shaft 504 having a helical thread 505, and one or more vertical support members 512. While two vertical support members 512 are shown in FIG. 5A, embodiments of the present disclosure are not so limited.

The shaft 504, and the one or more vertical support members 512, may be anchored to an optional base 506. The base 506 may a solid mass (e.g., concrete, etc.) resting on the floor of the body of liquid within which the wave energy conversion system is placed.

Alternatively, base 506 may be buoyant relative to the liquid within which it is immersed, such that the wave energy conversion system 500 floats near the surface of the body of liquid, with the base being further anchored or tethered to the floor of the body of liquid within which the wave energy conversion system is placed. According to one or more embodiments, the one or more vertical support members 512 form, or are attached to, vertical structural members of a sea-going platform (e.g., the legs of an oil drilling rig).

The shaft 504, and/or the one or more vertical support members 512, may be secured to an optional horizontal support structure 546, so as to provide lateral mechanical strength to the wave energy conversion system 500. The horizontal support structure 546 may be located at the top of the wave energy conversion system 500, as shown, or may be located intermediate along the elongated length of the shaft 504, and/or the one or more vertical support members 512. According to one or more embodiments, the horizontal support structure 546 may be the horizontal structure of a sea-going platform, such as an oil drilling rig.

FIG. 5A illustrates an electrical outlet conductor 526, such as a cable, wire, or other means for communicating the electrical power generated by the buoyant assembly 502A. While the electrical outlet conductor 526 is illustrated as exiting beneath the wave energy conversion system 500 (e.g., for routing to on-shore power infrastructure) embodiments of the present disclosure are not so limited. For example, the electrical outlet conductor 526 may be routed up to the horizontal support structure 546, to provide electrical power to operations upon a platform.

According to one embodiment, the wave energy conversion system 500 is an illuminated buoy having an energy storage device 527 (e.g., battery) coupled to a light-emitting device 529. The buoyant assembly 502A charges the energy storage device 527, and the light-emitting device 529 is powered from the energy storage device 527.

According to one or more embodiments, the wave energy conversion system 500 has a wave deflector 544 (e.g., attached to the one or more vertical support members 512) and/or base 506. The wave deflector 544 can provide lateral and vertical stability to the shaft 504 and the one or more vertical support members 512, to dampen movements thereof, so as to facilitate vertical movement of the buoyant assembly 502A relative to the shaft 504 for buoyant embodiments of the wave energy conversion system 500.

One or more embodiments of the buoyant assembly 502A includes a clutch assembly rotatably coupled to the shaft 504 so as to engage with the helical thread 505 for movement along the shaft 504 in a first direction (e.g., vertically down generally towards the water 516) and disengage from the helical thread 505 for movement along the shaft in a second direction (e.g., vertically up generally away from the water 516).

As was discussed above with respect to FIGS. 5A and 5B, and as will be discussed in greater detail below, one or more embodiments of the buoyant assembly 502A further includes a buoyant stator assembly having a number of conductor windings, a rotor assembly coupled to the clutch assembly and rotatably coupled to the buoyant stator assembly. The rotor assembly includes a magnetic field source (e.g., permanent magnet or electromagnet) positioned proximate to the windings. The rotor assembly is arranged to move the magnetic field source relative to the conductor windings, thereby generating electricity in the conductor windings, as the clutch assembly rotates about the shaft 504 and along the helical thread 505 when falling in the first direction (e.g., towards the water 516) by gravitational force.

System 500 can further include a tether, or other anchoring means as previously discussed with respect to FIGS. 1A and 4A. A tether may be connected to ballast weight, but it can also be connected to other parts of system 500 (e.g., to shaft 104 or vertical support members 512) or wave plates 544.

The remote end of a tether may be connected to a mooring system (as will be discussed further with respect to FIG. 6), which can be any system or arrangement that allows the system 100 to maintain a relatively constant geographic position. For example, the mooring system could comprise a weight such as an anchor or pilings.

Figure 5B:
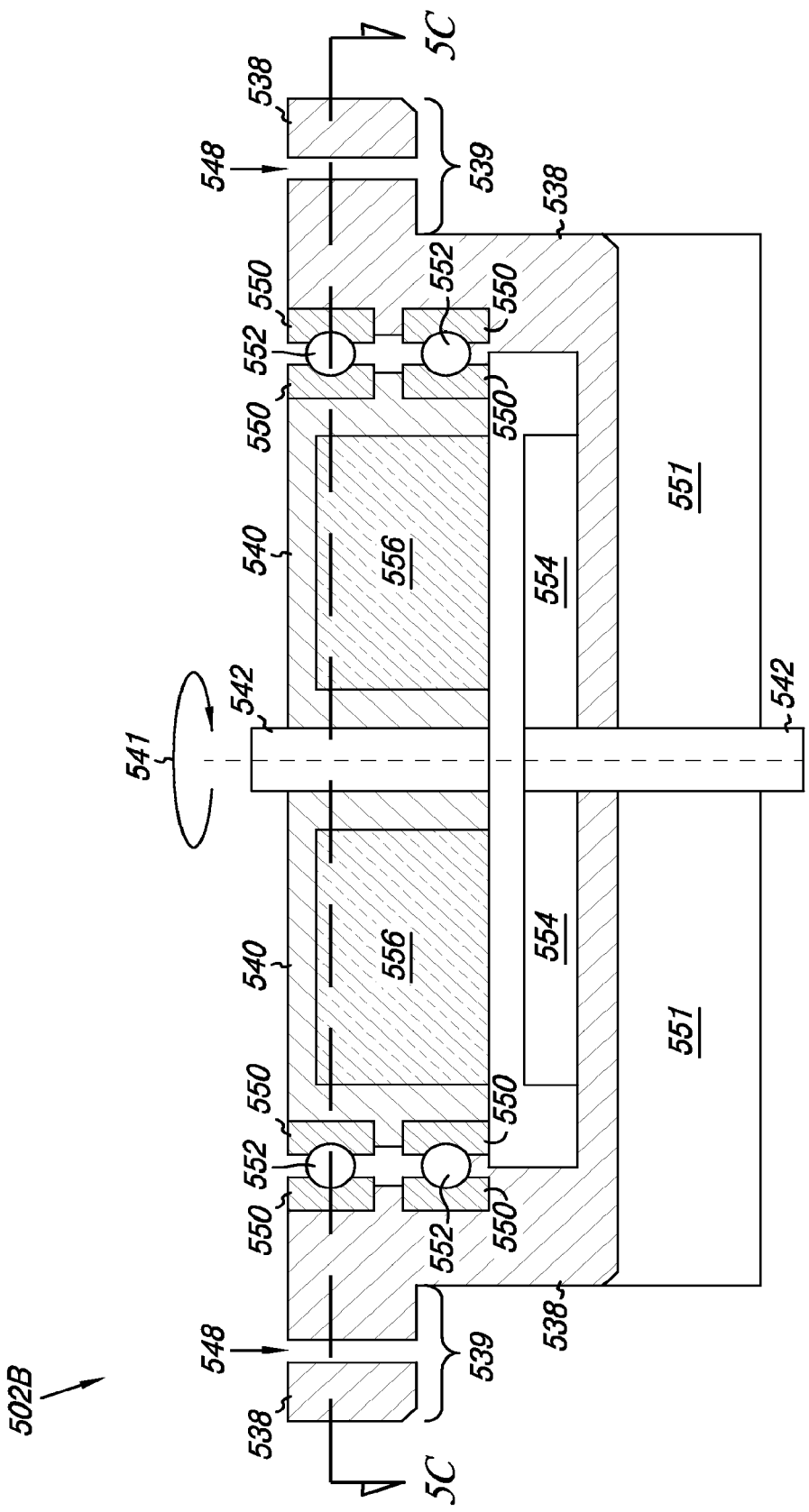
FIG. 5B is a cross-sectional view of a buoyant power generator, in accordance with one or more embodiments of the present disclosure.

FIG. 5B is a cross-sectional view of a buoyant power generator, in accordance with one or more embodiments of the present disclosure. FIG. 5B illustrates a buoyant assembly 502B. The structure of the buoyant assembly 502B includes a single rotor assembly 540 rotationally coupled to a single stator assembly 538, which is coupled to a buoyant member 551.

According to one or more embodiments, the buoyant member 551 is positioned to protect the stator assembly 538 from the fluid (e.g., 516 in FIG. 5A). For example, the buoyancy member may be located below the stator assembly 538 (as shown in FIG. 5B), or may envelop more of the stator assembly 538, or may wholly contain and/or enclose the stator assembly 538 and rotor 540 assemblies. Together, the stator assembly 538 and the buoyant member comprise a buoyant stator assembly.

As shown in FIG. 5B, the stator assembly 538 may be formed to provide a recess within which the rotor assembly 540 is located. The stator assembly 538 may have a flange 539, having an opening 548 therethrough by which the buoyant stator assembly may be slidably coupled to a vertical support member (not shown in FIG. 5B—see FIG. 5A). The stator assembly 538 includes conductor windings 554 mounted thereon, proximate to the rotor assembly 540, and generally located axially to the location of the shaft (not shown) passing through the stator assembly 538.

According to one or more embodiments, the rotor assembly 540 is seated with the stator assembly 538. At least one bearing assemblies 550, including for example a bearing 552, is seated between an outer periphery part of the rotor assembly 540 and the recess wall of the stator assembly 538 to rotationally couple the rotor assembly 540 and the stator assembly 538.

As the rotor assembly 540 is recessed into the stator assembly 538, the at least one bearing assemblies 550 couple the rotor assembly 540 and the stator assembly 538 perpendicularly to an orientation of the shaft (not shown), to provide vertical stability to the rotor assembly 540 as it rotates about the centrally-located shaft (not shown). The plane of rotation 541 of the rotor assembly 540 is oriented perpendicular to the shaft (e.g., 504 in FIG. 5A).

A clutch 542 rotationally couples the rotor assembly 540 to the shaft (not shown) as previously described with respect to previous figures. The bearing assemblies 550 also transmit the buoyancy force of the buoyancy member 551, through the stator assembly 538, to the rotor assembly 540, to lift the rotor assembly 540 up along with the buoyant stator assembly.

According to one or more embodiments, the rotor assembly 540 includes a magnetic field source 556, such as a permanent magnet or electromagnet. The magnetic field source 556 is positioned on the rotor assembly 540 so as to be located proximate to the conductor windings 554 positioned on the stator assembly 538. The conductor windings 554 and the magnetic field source 556 of the rotor assembly 540 are separated by an air gap.

The rotor assembly 540 rotates about the central shaft (not shown) as the clutch assembly 542 engages to follow the incline plane of the helical thread under the influence of gravity (e.g., when the buoyancy force to the buoyant member is less than the gravitational force). Rotation of the rotor assembly 540 causes to magnetic field source 556 to move relative to the conductor windings 554, thereby inducing an electric current in the conductor windings 554, as is well known in the art.

Figure 5C:
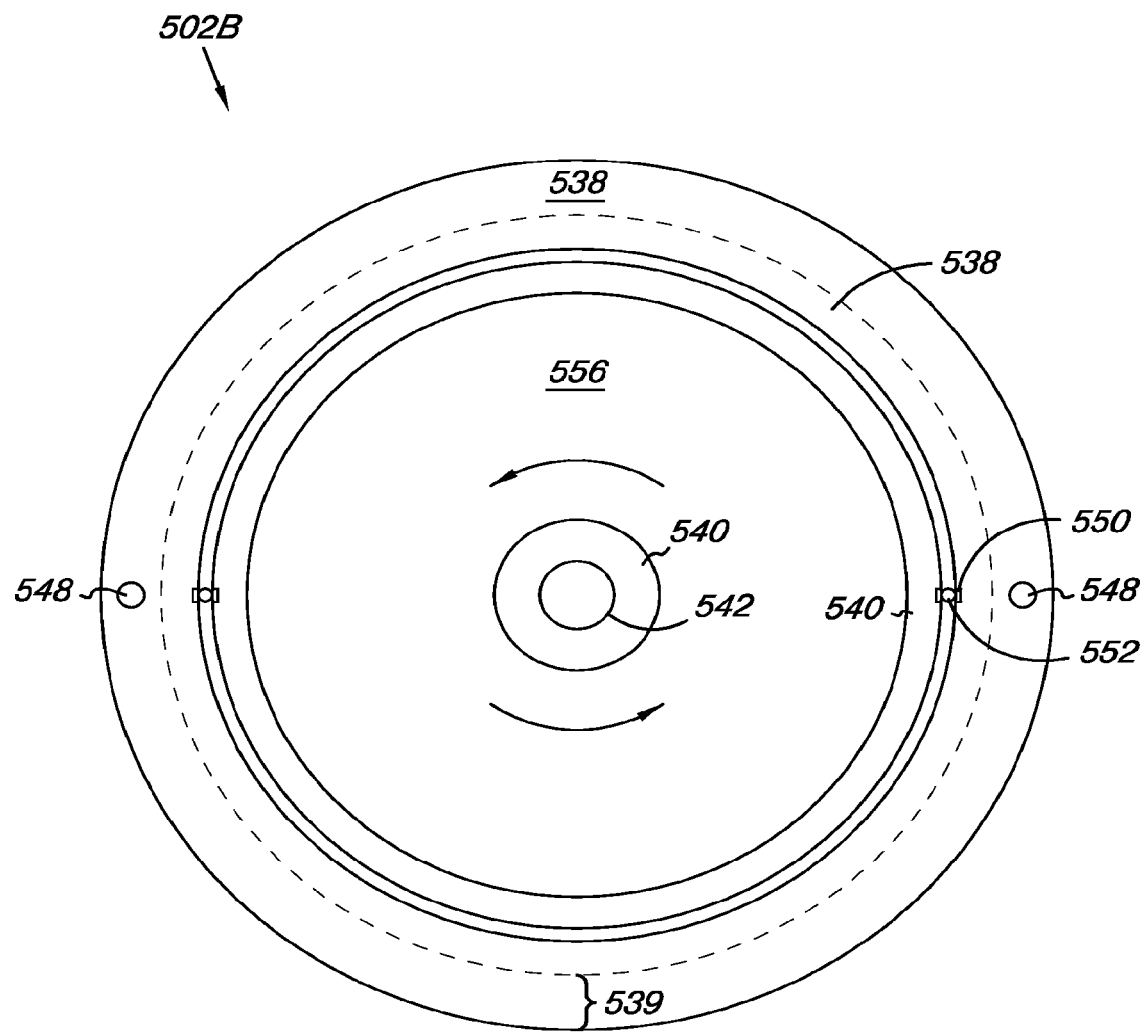
FIG. 5C is a top view of a buoyant power generator, in accordance with one or more embodiments of the present disclosure.

FIG. 5C is a top view of a buoyant power generator, in accordance with one or more embodiments of the present disclosure. This view of the buoyant assembly 502B is taken along cut line 5C-5C of FIG. 5B, and illustrates the radial orientations of the rotor assembly 540 and the stator assembly 538.

The extent of the flange 539 is indicated, as well as the location of openings 548 for slidably coupling to vertical support members (not shown). Relative positioning of the bearing assemblies 550 (including bearing 552) is shown between the rotor assembly 540 and the stator assembly 538.

The clutch assembly 542 is located adjacent the shaft (not shown), and coupled to at least the rotor assembly 540. This cut also shows the magnetic field source 556, positioned on the rotor assembly 540.

Figure 6:
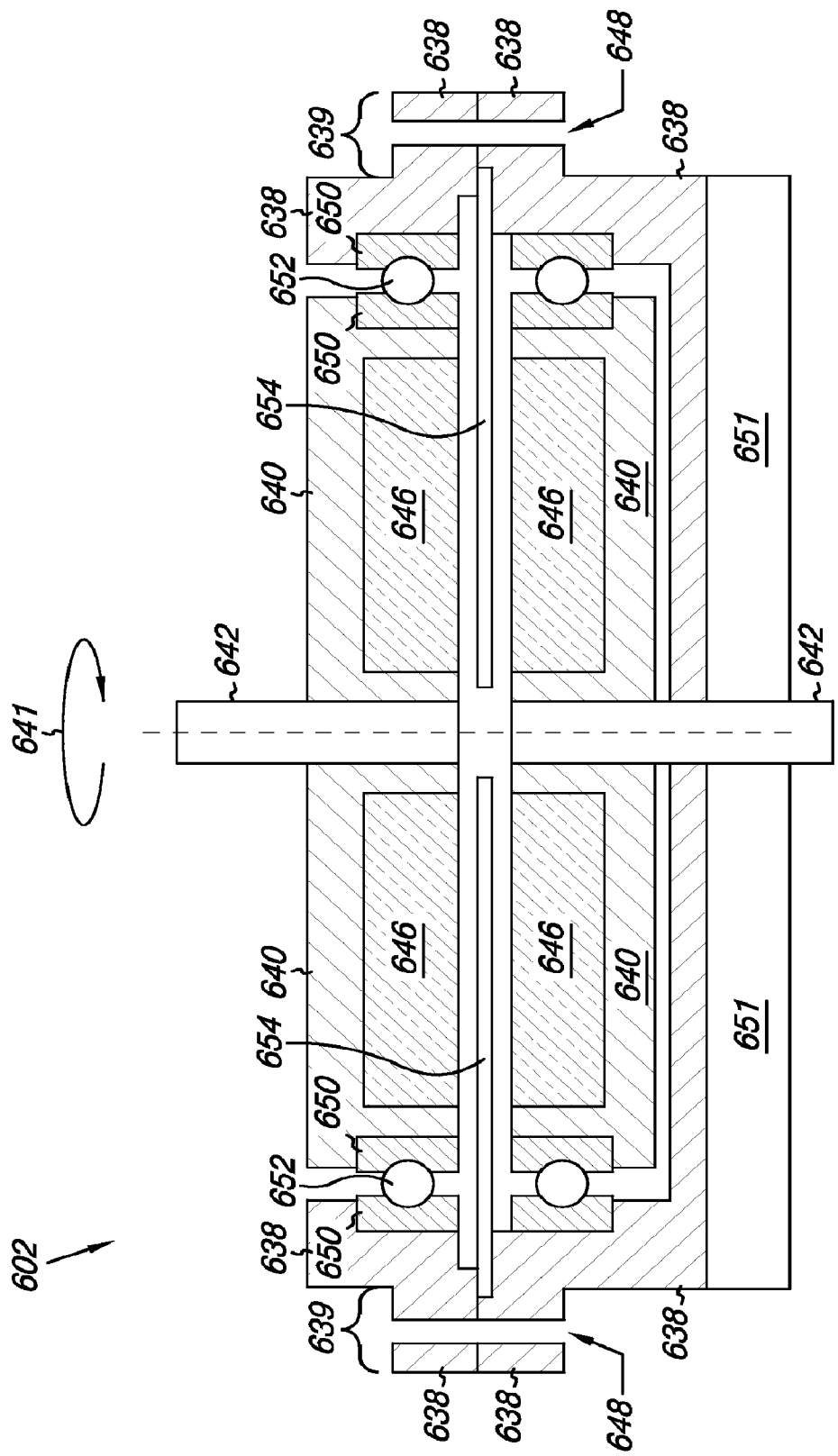
FIG. 6 is a cross-sectional view of a twin-rotor buoyant power generator, in accordance with one or more embodiments of the present disclosure.

FIG. 6 is a cross-sectional view of a twin-rotor buoyant power generator, in accordance with one or more embodiments of the present disclosure. The buoyant assembly 602 shown in FIG. 6 is similar in many respects to the buoyant assembly 502B shown in FIG. 5B.

With respect to FIG. 6, the reference numerals of the 6xx series have the same last two digits as the reference numerals of the 5xx series corresponding to FIG. 5B to indicate the same structure. Thus, common structure features will not be repeated here.

The reader will observe that the buoyant assembly 602 includes a twin-rotor design, with a rotor assembly 640, including magnetic filed source 646, being located both above and below conductor windings 654. The conductor windings 654 are held in place between portions of the split stator assembly 638, as shown.

Each portion of the twin-rotor assembly 640 is coupled to a clutch 642, and rotatably coupled to the stator assembly 638 through, for example, one or more bearing assemblies 650 (including bearing 552). As the twin-rotor assembly 640 rotates about the shaft (not shown), moving the magnetic field source 646 relative to the conductor windings 654, the conductor windings 654 excited from two directions by a magnetic field to induce current in the conductor windings 654. Thus, the twin-rotor buoyant assembly 602 may be more efficient in generating electricity than the single rotor version shown in FIG. 5B.

Figure 7:
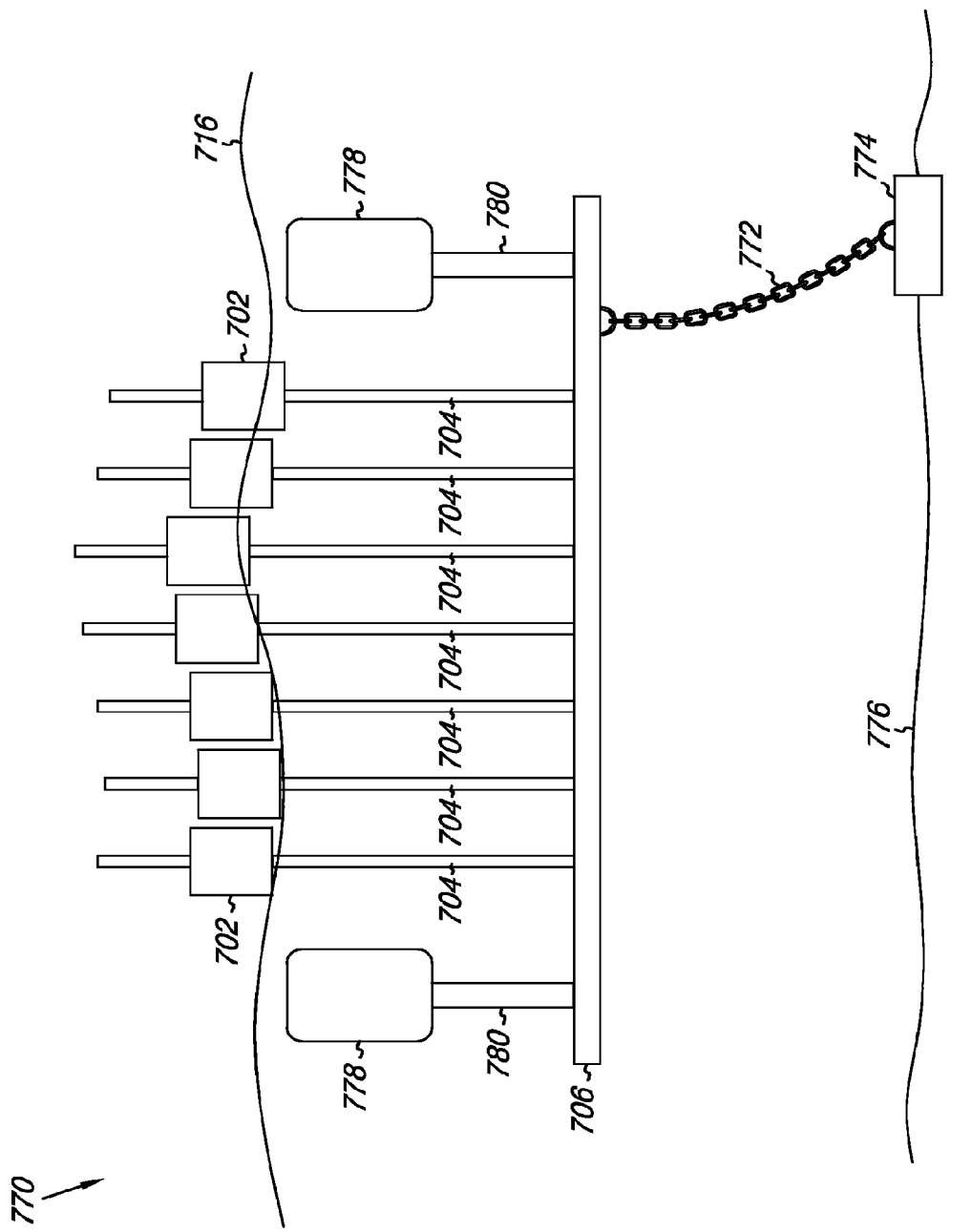
FIG. 7 is a side view of a buoyant power generator system having multiple buoyant generators, in accordance with one or more embodiments of the present disclosure.

FIG. 7 is a side view of a power generation system having multiple generators, in accordance with one or more embodiments of the present disclosure. A power generation system 770, in accordance with one or more embodiments of the present disclosure is shown.

In this embodiment, multiple power generation systems (e.g., 100 shown in FIG. 1 and/or 500 shown in FIG. 5A) are provided on a common horizontal stabilization platform base 706. For simplicity in illustrating the features of the power generation system 770, only the respective buoyant assembly 702 and shaft 704 for each individual power generation system is shown, with other detail (such as vertical support members, etc.) omitted.

One or more platform floats 778 may also be attached to the horizontal stabilization platform base 706, by structural members 780, as shown. The one or more platform floats 778 may be used to suspend the horizontal stabilization platform base 706 at a specified depth, relative to the level of the oscillating fluid 716.

The horizontal stabilization platform base 706 is typically anchored to the floor 776 using an anchor 774 and a chain 772. The anchor prevents the power generation system 770 from drifting.

Figure 8A:
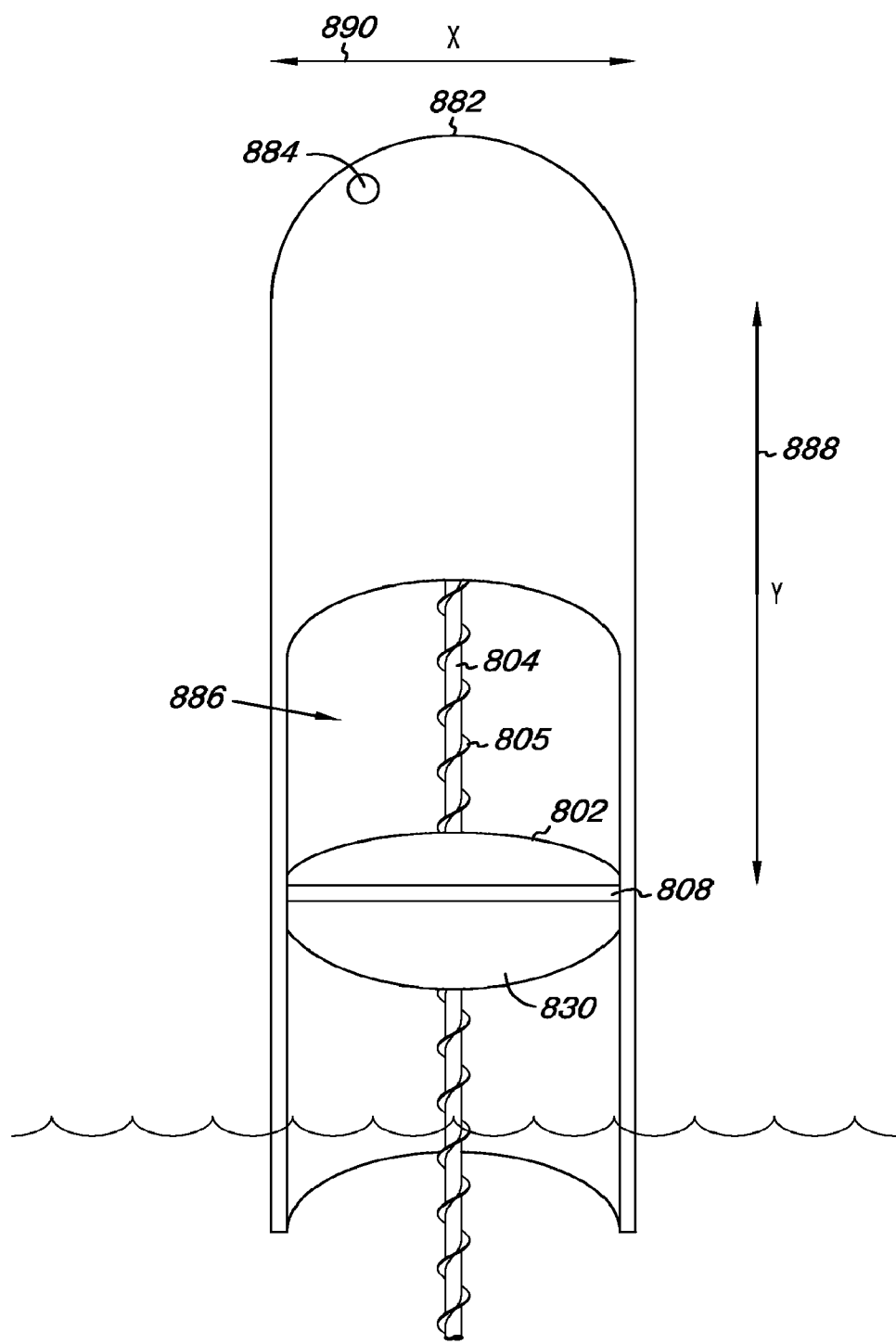
FIG. 8A is a front view of a buoyant power generator system having a partial enclosure, in accordance with one or more embodiments of the present disclosure.
Figure 8B:
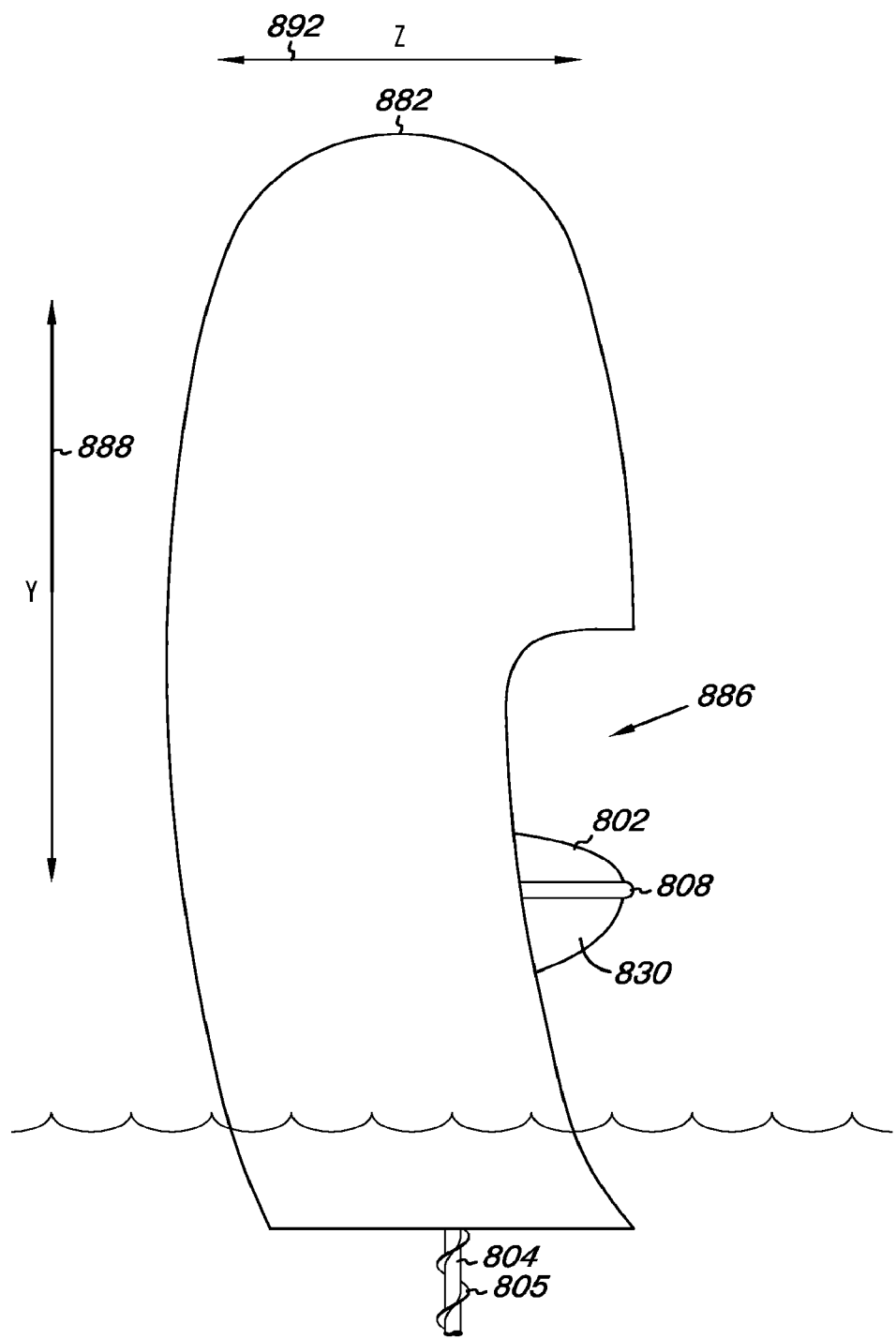
FIG. 8B is a side view of a buoyant power generator system having a partial enclosure, in accordance with one or more embodiments of the present disclosure.

FIG. 8A is a front view, and FIG. 8B is a side view, of a buoyant power generator system having a partial enclosure, in accordance with one or more embodiments of the present disclosure. In some embodiments, the buoyant power generator system is partially enclosed to extract additional energy from wave action, and/or to reduce some of the dampening effects of wind resistance.

For example, the buoyant power generator system (e.g., buoyant power generator system 100 illustrated in FIG. 1A) is shown in FIGS. 8A and 8B partially enclosed in a housing, such as a tube-like structure 882. The system includes a shaft 804 with a helical threading 805 and a buoyant assembly 802 having a flywheel portion 808 and a buoyant member portion 830.

Enclosing tube structure 882 has a relatively larger opening 886 in lower portion in a particular direction, and arranged to allow entry of a wave into the tube structure 882. The tube structure may be constructed to have a fixed orientation (e.g., opening in a direction toward waves approaching a shore) or may be constructed to pivot in a manner that opening 886 faces into the direction from which waves are traveling (e.g., into the wind).

Structure 882 is configured to collect waves, and in some embodiments, channel the collected waves so as to direct the volume of fluid of the waves into an increasingly smaller tubular cross-section, operating in a manner similar to a venturi tube, in order to obtain greater linear displacement of the buoyant assembly 802 as a result of a given volume of substantially uncompressible fluid being temporarily contained by a vessel of decreasing cross-sectional area. Thus, greater hydraulic pressure is exerted in the dimension perpendicular to the cross-section. In this application, the result is greater lifting force applied to the buoyant assembly 802, and greater lifting distance in the vertical (i.e., "Y" 888) direction.

One skilled in the art will appreciate that the cross-section of interest is the vertical cross-section of the tube (i.e., the plane oriented in the "X" 890 and "Z" 892 directions) as shown in FIGS. 8A and 8B. From FIG. 8B one can observe the scoop shape of tube structure 882, intended to direct the movement of mass attributable to the wave volume upward, thus in the direction of lift for the buoyant assembly 802. The tube structure 882 may also be configured in a more pronounced venturi shape (e.g., being larger below, and in some embodiments above, the portion of the tube structure 882 within which the buoyant assembly 802 travels) thus speeding the time to lift buoyant assembly 802.

The back wall of tube structure 882 (e.g., wall opposite opening 886) may be substantially vertical, or as illustrated in FIG. 8B, may be curved such that when a wave enters opening 886, the lower portion of the wave will be impeded by the walls of tube structure 882 before the upper portion to force the force of the wave up towards the buoyant assembly 802. Thus, the shape of the tube structure 882 may be designed to convert the energy associated with the forward movement of the wave into upward movement of the fluid (e.g., water) which may more efficiently lift the buoyant assembly 802 upward, in some embodiments. Shaping the tube structure 882 to channel the wave, and thus dissipate its energy in a more vertical direction, also may serve to preserve the structural integrity of the tube structure 882 since, for example, direct horizontal impact of the wave force on the tube structure 882 may be reduced or minimized.

Structure 882 may have one or more openings 884 near the top to allow trapped air to vent. In some embodiments, openings 884 are smaller in area than opening 886.

Figure 9:
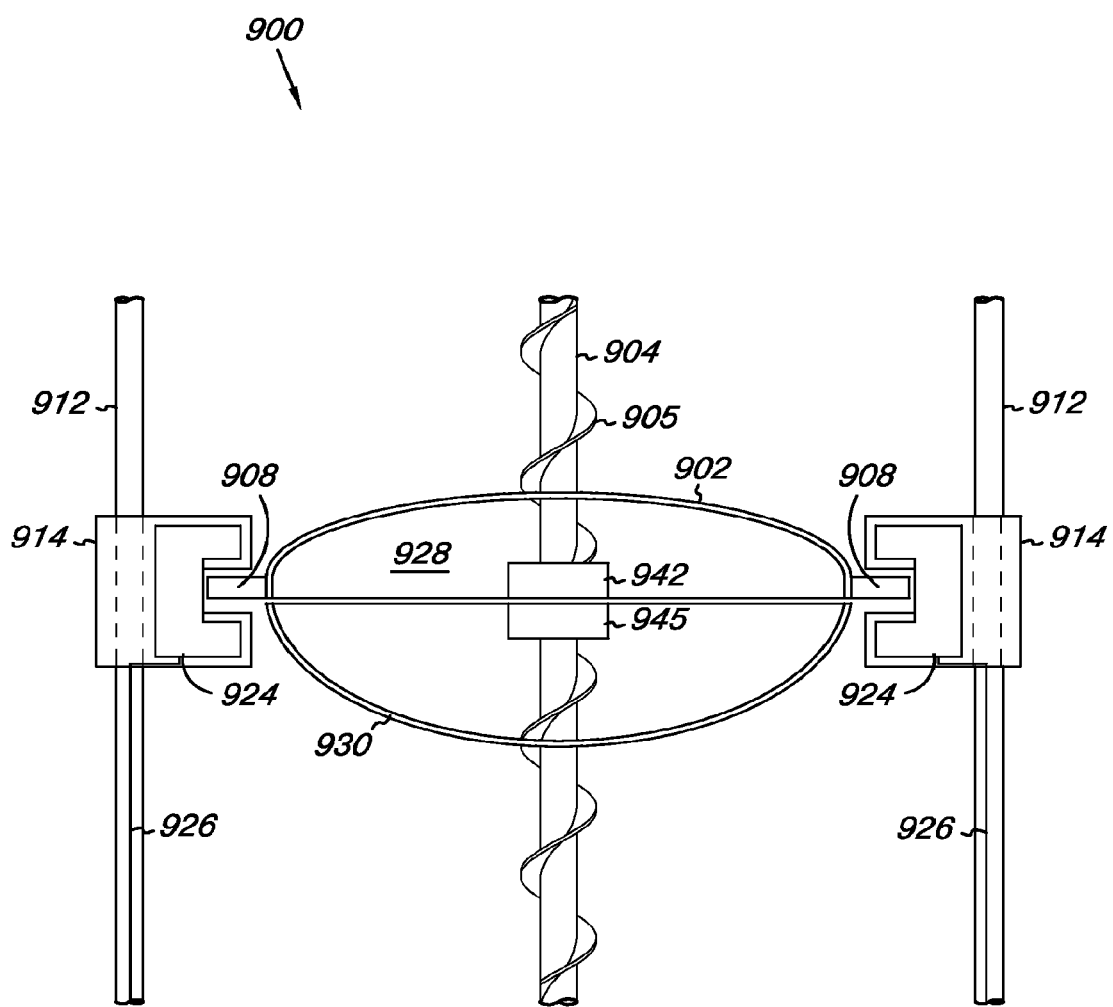
FIG. 9 is a cross-sectional view of a buoyant power generator system having magnetic elements on the buoyant rotor assembly, in accordance with one or more embodiments of the present disclosure.

FIG. 9 is a cross-sectional view of a buoyant power generator system having magnetic elements on the buoyant rotor assembly, in accordance with one or more embodiments of the present disclosure. In this embodiment, the buoyant assembly 902 includes an upper portion and a lower portion.

In some embodiments, the upper and lower portions can rotate freely of each other. For instance, in the embodiment of FIG. 9, the upper portion, having area 928 rotates freely from the lower portion (e.g., buoyant member 930) as the assembly 902 moves upward and downward along shaft 904.

In such embodiments, one or both of the clutch portions 942 and 945 engage the threading 905 on the shaft 904 which provides rotation to the portions of the assembly 902 engaged therewith. As in previously described embodiments, one or both clutches may disengage in one direction and engage in the opposite direction of travel of the assembly (in this case the portion of the assembly to which the clutch is attached).

In some embodiments, the clutches 942 and 945 or other surfaces in between the upper and lower portions, can have magnets thereon that repel each other. These magnets can be used, for example, to reduce friction between the upper and lower portions.

In various embodiments, other low friction mechanisms can be used. For instance, in some embodiments, ball bearings may be used to reduce friction between the two portions. Ball bearings or other low frictions mechanisms can also be used at the interface between the one or more clutch mechanisms and the thread and/or shaft surface.

Embodiments, such as that illustrated in FIG. 9, can provide benefits, such as, for example, allowing rotational movement of the lower portion to be disturbed by interaction with the fluid (e.g., when a wave hits the surface of the lower portion) while allowing the upper portion to continue to rotate and thereby continue to convert rotational and/or translational energy into electrical energy. In some such embodiments, the magnetic repelling force and/or contact between the two portions, can be used to raise the upper portion in preparation for converting kinetic rotational and translational energy into electrical energy.

In some embodiments, the clutch on one portion of the assembly 902 can be different than the clutch on the other portion, for example, allowing the upper portion to move downward more slowly and thereby providing some separation between the upper and lower portions. Such embodiments may further limit resistance by, for example reducing or removing any resistance that might be created by the repelling force of the magnets, in some instances.

In contrast with the buoyant power generator system illustrated in FIG. 1C (where generators are located peripheral to, and rotationally coupled with, the buoyant assembly, which transfers mechanical energy to spin the generator axis), the buoyant power generator system shown in FIG. 9 has magnetic elements 908 located on the buoyant rotor assembly 902 that move past one or more stationary conductors 924 as the buoyant rotor assembly 902 rotates.

The buoyant power generator system 900 includes the shaft 904 having helical thread 905, a first vertical support member 912 arranged substantially parallel to the shaft 904, and a first generator 914 slidably coupled to the first vertical support member 912. The clutch assembly 942 is rotatably coupled to the shaft 904 so as to engage with the helical thread 905 for movement along the shaft 904 in a first direction, e.g., downward, and disengage from the helical thread 905 for movement along the shaft in a second direction (e.g., upward in the orientation of FIG. 9).

The power generator embodiment 900 further includes a buoyant rotor assembly 902 coupled to the clutch assembly 942. The first generator 914 is arranged to create electric energy from interaction of the one or more stationary conductors 924 with a number of magnetic elements 908 on the buoyant rotor assembly 902, in a manner to produce electricity, as the clutch assembly 942 rotates about the shaft 904 and along the helical thread 905 when falling in the first direction due to a gravitational force.

As one skilled in the art will appreciate, the buoyant rotor assembly 902 is lifted by the fluid there-beneath, and rotates about the shaft 904 as it falls when the fluid beneath recedes. As the buoyant rotor assembly 902 rotates, the magnetic elements 908 on the buoyant rotor assembly 902 are moved past the one or more stationary conductors 924 of the generator assembly 914, thereby producing electrical energy in the one or more stationary conductors 924, which is carried away from the generator 914 by and outlet conductor 926. Thus for this buoyant power generator system embodiment 900, no mechanical contact is made between the buoyant rotor assembly 902 and the generator assembly 914, since the magnetic elements 908 need only be moved in proximity to the one or more stationary conductors 924.

CONCLUSION

The present disclosure includes apparatus and systems for power generation. One power generator embodiment includes a shaft having a helical thread, a first vertical support member arranged substantially parallel to the shaft, and a first generator slidably coupled to the first vertical support member. A clutch assembly is rotatably coupled to the shaft so as to engage with the helical thread for movement along the shaft in a first direction, and disengage from the helical thread for movement along the shaft in a second direction.

The power generator embodiment further includes a buoyant rotor assembly coupled to the clutch assembly. The first generator is arranged to create electric energy from interaction of the first generator with a number of magnetic elements on the buoyant rotor assembly, in a manner to produce electricity, as the clutch assembly rotates about the shaft and along the helical thread when falling in the first direction due to a gravitational force.

Unless explicitly stated, the method embodiments described herein are not constrained to a particular order or sequence. Additionally, some of the described method embodiments, or elements thereof, can occur or be performed at the same, or at least substantially the same, point in time.

It is to be understood that the use of the terms "a", "an", "one or more", "a number of", or "at least one" are all to be interpreted as meaning one or more of an item is present. Additionally, it is to be understood that the above description has been made in an illustrative fashion, and not a restrictive one. Combination of the above embodiments, and other embodiments not specifically described herein will be apparent to those of skill in the art upon reviewing the above description.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A power generator, comprising:
a shaft having a helical thread;
a first vertical support member arranged substantially parallel to the shaft;
a first generator slidably coupled to the first vertical support member;
a clutch assembly rotatably coupled to the shaft so as to engage with the helical thread for movement along the shaft in a first direction, and disengage from the helical thread for movement along the shaft in a second direction;
a buoyant rotor assembly coupled to the clutch assembly; and
wherein the first generator is arranged to create electric energy from interaction of a conductor with a number of magnetic elements on the buoyant rotor assembly, in a manner to produce electricity, as the clutch assembly rotates about the shaft and along the helical thread when falling in the first direction due to a gravitational force.

2. The power generator of claim 1, wherein the clutch assembly and buoyant rotor assembly are free to rotate about the shaft as the buoyant rotor assembly is moved in the second direction by a buoyant force applied by a rising fluid therebeneath.

3. The power generator of claim 1, wherein the periphery of the buoyant rotor assembly is a flywheel, and wherein the majority of the buoyant rotor assembly mass is located near a periphery of the assembly.

4. The power generator of claim 1, further comprising:
a second vertical support member arranged substantially parallel to the shaft;
a second generator slidably coupled to the second vertical support member; and
wherein the second generator is arranged to create electric energy from interaction of a second conductor with a number of magnetic elements on the buoyant rotor assembly, in a manner to produce electricity, as the clutch assembly rotates about the shaft and along the helical thread when falling in the first direction due to a gravitational force.

5. The power generator of claim 4, further comprising:
a third vertical support member arranged substantially parallel to the shaft;
a third generator slidably coupled to the third vertical support member; and
wherein the third generator is arranged to create electric energy from interaction of a third conductor with a number of magnetic elements on the buoyant rotor assembly, in a manner to produce electricity, as the clutch assembly rotates about the shaft and along the helical thread when falling in the first direction due to a gravitational force.

6. The power generator of claim 1, wherein a distance along the length of the shaft between successive turns of the helical thread is different for a first portion of the shaft than for a second portion of the shaft.

7. The power generator of claim 6, wherein the distance along the length of the shaft between successive turns of the helical thread is increasingly shorter along a length of the shaft.

8. The power generator of claim 6, wherein the distance along the length of the shaft between successive turns of the helical thread is shorter for the first portion than for the second portion.

9. The power generator of claim 6, wherein the first portion is located at a higher elevation on the shaft than the second portion.

10. The power generator of claim 6, wherein the distance along the length of the shaft between successive turns of the helical thread is arranged to initially slow vertical movement along the shaft of the clutch assembly so as to provide temporary separation of the buoyant rotor assembly from a receding buoyant force.

11. A power generator, comprising:
a shaft having a helical thread;
a clutch assembly rotatably coupled to the shaft so as to engage with the helical thread for movement along the shaft in a first direction;
a buoyant stator assembly including a number of conductor windings;
a rotor assembly coupled to the clutch assembly and rotatably coupled to the buoyant stator assembly, the rotor assembly including a magnetic field source positioned proximate to the windings; and
wherein the rotor assembly is arranged to move the magnetic field source relative to the conductor windings, thereby generating electricity in the conductor windings, as the clutch assembly rotates about the shaft and along the helical thread when falling in the first direction by gravitational force.

12. The power generator of claim 11, wherein the rotor assembly is coupled to the buoyant stator assembly perpendicularly to an orientation of the shaft.

13. The power generator of claim 12, wherein the rotor assembly is positioned within a cavity formed about the shaft by the buoyant stator assembly.

14. The power generator of claim 13, wherein the magnetic field source is positioned above the conductor windings.

15. The power generator of claim 14, wherein the clutch assembly is rotatably coupled to the shaft so as to engage with the helical thread for movement along the shaft in a first direction, and to disengage from the helical thread for movement along the shaft in a second direction.

16. The power generator of claim 13, wherein buoyant stator assembly includes a buoyant member coupled to a housing member, the housing member containing the conductor windings.

17. The power generator of claim 11, wherein the buoyant stator assembly is slidably coupled to at least one vertical support structure to prevent rotation of the buoyant stator assembly about the shaft.

18. The power generator of claim 11, wherein the clutch assembly and rotor assembly are free to rotate about the shaft when the buoyant stator assembly is moved in the second direction as a buoyant force is applied by a rising fluid thereneath.

19. The power generator of claim 11, including a wave-directing structure partially enclosing the shaft and having a cross-section permitting travel along the shaft of the buoyant stator assembly.

20. The power generator of claim 19, wherein the wave-directing structure is configured as a venture tube.

* * * * *